United States Patent
Yamada et al.

(10) Patent No.: US 7,031,243 B2
(45) Date of Patent: Apr. 18, 2006

(54) BEAT DENSITY DETECTING APPARATUS AND INFORMATION PLAYBACK APPARATUS

(75) Inventors: Yoichi Yamada, Saitama-ken (JP); Tomohiko Kimura, Saitama-ken (JP); Koichiro Sakata, Saitama-ken (JP); Hiroyuki Isobe, Saitama-ken (JP); Yuuji Murai, Saitama-ken (JP); Mituo Fukuda, Saitama-ken (JP); Tatsuya Shiraishi, Saitama-ken (JP); Gen Inoshita, Tokyo (JP); Ko Atsumi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 411 days.

(21) Appl. No.: 10/147,975

(22) Filed: May 20, 2002

(65) Prior Publication Data

US 2002/0172118 A1    Nov. 21, 2002

(30) Foreign Application Priority Data

May 18, 2001    (JP)    ............................... 2001-149366

(51) Int. Cl.
G11B 7/00    (2006.01)
(52) U.S. Cl. .................................................. 369/53.31
(58) Field of Classification Search ............. 369/53.31; 700/94; 84/662, 648, 609–612, 614, 616, 84/626–627, 649–654, 735–738; 381/61, 381/118
See application file for complete search history.

(56) References Cited

U.S. PATENT DOCUMENTS 5,008,872 A * 4/1991 Tomoda et al. .......... 369/30.18
5,138,600 A    8/1992 Aoyagi
5,428,593 A * 6/1995 Kanai et al. ............. 369/53.31

(Continued)

FOREIGN PATENT DOCUMENTS

EP    0 944 034 A1    9/1999

(Continued)

OTHER PUBLICATIONS

Patent Abstracts of Japan vol. 2000, No. 11, 3 Nanuary 2001 (Jan. 3, 2001) & JP 2000 221976 A (Yamaha Corp.), Aug. 11, 2000.

(Continued)

*Primary Examiner*—Brian E. Miller
*Assistant Examiner*—Peter Vincent Agustin
(74) *Attorney, Agent, or Firm*—Arent Fox PLLC

(57) ABSTRACT

A beat density detecting apparatus and an information playback apparatus are provided to detect distinctive characteristics that music or the like has and to provide the same as a novel information volume. Playback data read out from an information recording medium, such as an optical disc, and sub-code data containing the information of an elapsed track time indicating a recording position of the playback data are provided to a beat detecting unit and a beat position detecting unit, respectively. The beat detecting unit detects the number of occurrences of a change in amplitude at each predetermined frequency of the playback data, and the beat position detecting unit detects an elapsed track time from the sub-code data. Further, a beat density computing unit finds the number of occurrences with respect to the elapsed track time as the characteristics information of a beat density. By displaying the characteristics information of the beat density on a display unit in a way that the user or the like can visually recognize, it is possible to provide the distinctive characteristics that music or the like has not as instantaneous characteristics, but as the characteristics of a relatively long period, or the whole of the characteristics of a signal subject to audio playback.

10 Claims, 15 Drawing Sheets

U.S. PATENT DOCUMENTS

| | | |
|---|---|---|
| 5,614,687 A | 3/1997 | Yamada et al. |
| 6,175,632 B1 | 1/2001 | Marx |
| 6,225,546 B1 * | 5/2001 | Kraft et al. .................. 84/609 |
| 6,229,779 B1 | 5/2001 | Berry et al. |
| 2003/0045954 A1 * | 3/2003 | Weare et al. ................. 700/94 |

FOREIGN PATENT DOCUMENTS

| | | |
|---|---|---|
| EP | 0 997 171 A1 | 2/2000 |
| EP | 0 987 709 A2 | 3/2000 |
| EP | 1 073 055 A2 | 1/2001 |
| EP | 1 073 056 A2 | 1/2001 |
| EP | 1073056 A2 | 1/2001 |
| JP | 04119569 A * | 4/1992 |
| WO | WO 01/13373 A1 | 2/2001 |

OTHER PUBLICATIONS

European Search Report.
Patent Abstracts of Japan vol. 2000, No. 11, Jan. 3, 2001 & JP 2000 221976 A (Yamaha Corp.), Aug. 11, 2000.
European Search Report.

* cited by examiner

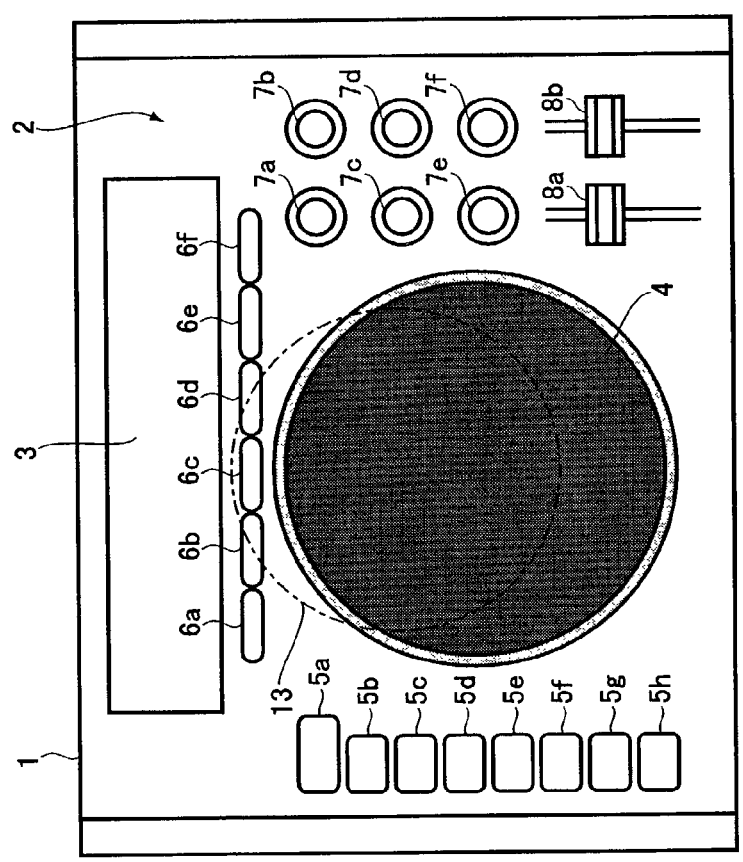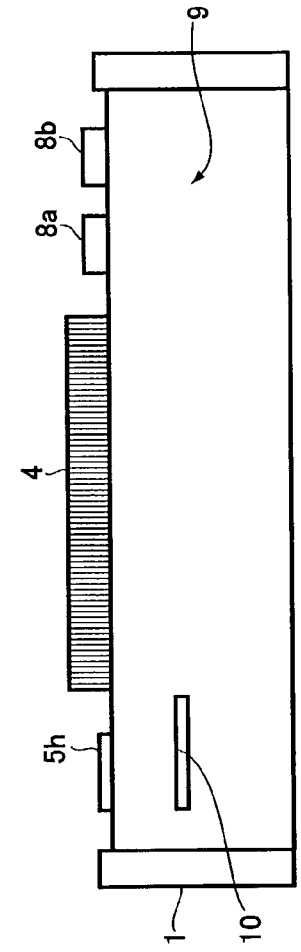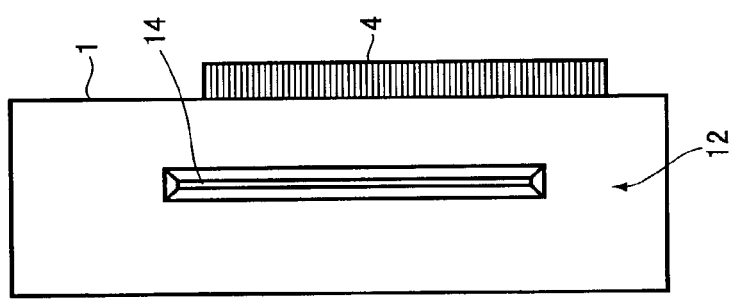

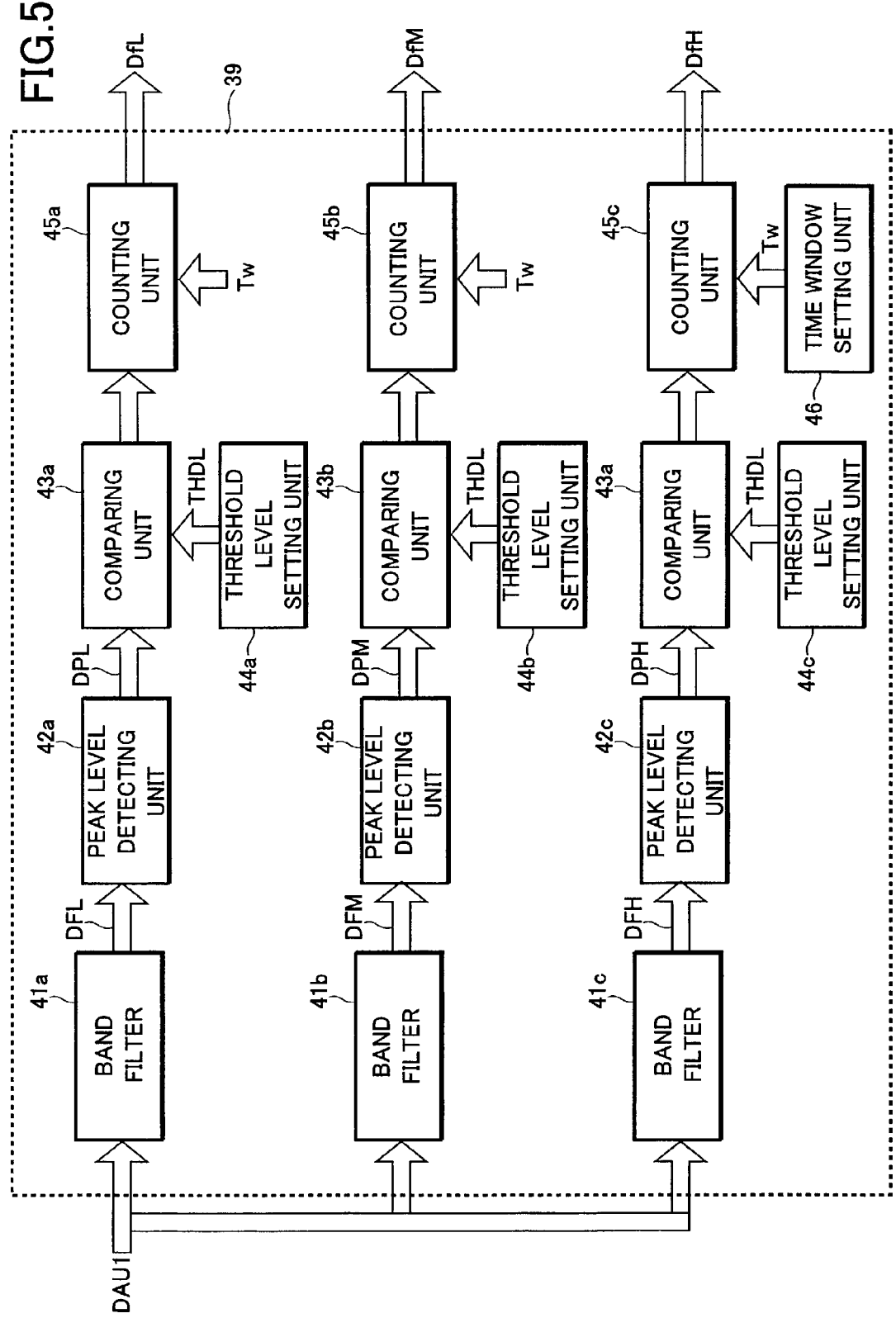

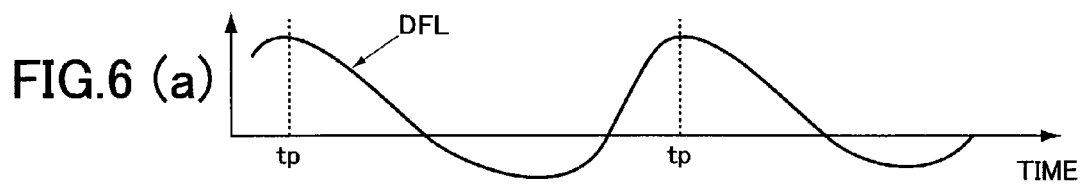
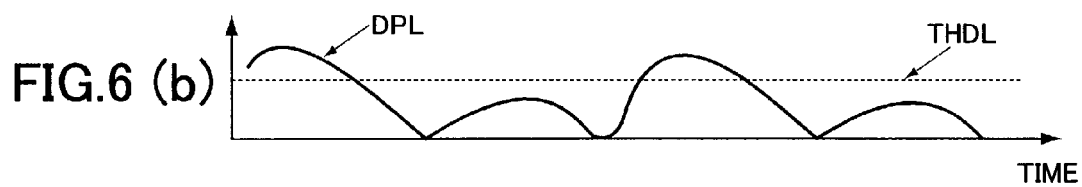
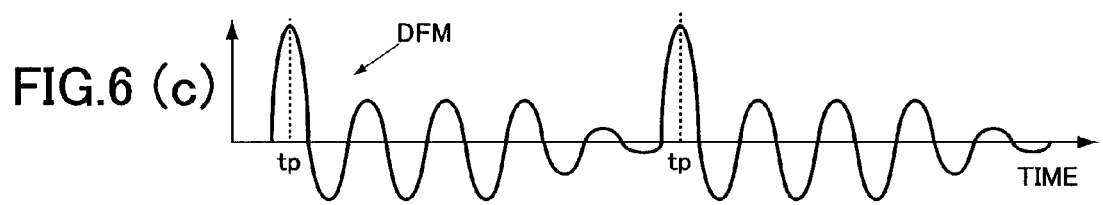
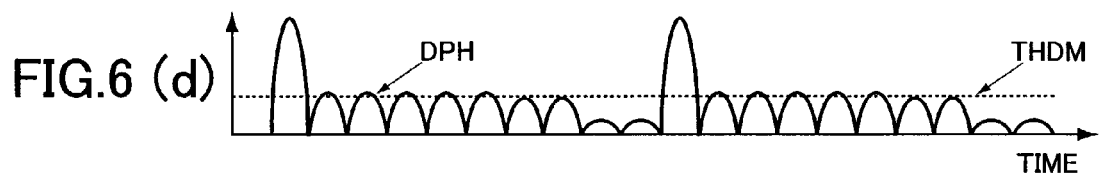
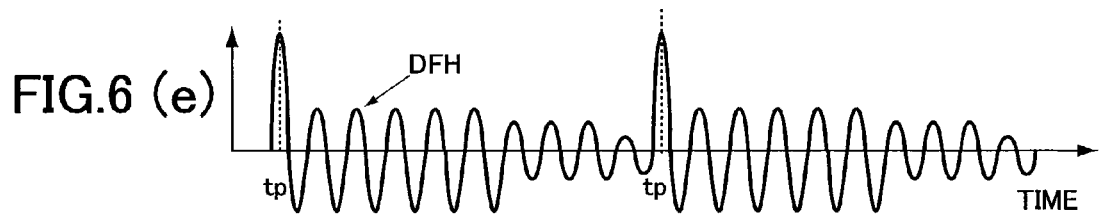
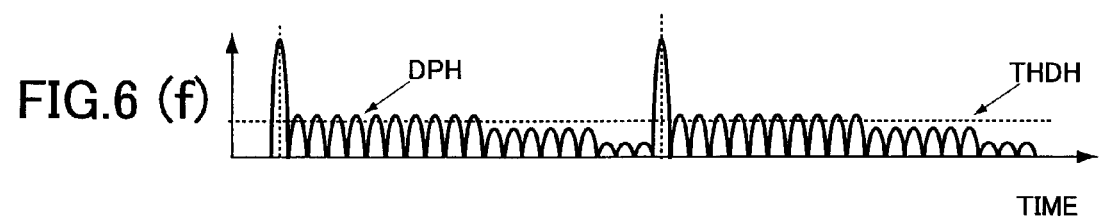

BEAT DENSITY DETECTING APPARATUS AND INFORMATION PLAYBACK APPARATUS

BACKGROUND OF THE INVENTION

The present invention relates to a beat density detecting apparatus for detecting a beat density as characteristics of audio information, such as music and voices, and to an information playback apparatus equipped with the beat density detecting apparatus.

The present invention claims priority from Japanese Application No. 2001-149366, the disclosure of which is incorporated herein by reference for all purposes.

Conventionally, an information playback apparatus, such as a CD (Compact Disc) player and a DVD (Digital Versatile Disc) player, is provided with a spectrum display unit for displaying frequency characteristics of a playback sound played at a speaker.

The spectrum display unit is formed on a manipulation panel unit of the information playback apparatus, and as shown in FIG. 14, displays a spectrum obtained by subjecting audio data played back from a CD or a DVD to a Fourier transform and the like in real time as a level (unit: decibels) with respect to an audio frequency band.

Also, the manipulation panel unit of the information playback apparatus is provided with an equalizer adjustment unit accompanying the spectrum display unit, so that a user can adjust the frequency characteristics of a playback sound by properly adjusting the positions of a plurality of sliding adjustment levers provided to the equalizer adjustment unit.

Incidentally, according to the conventional information playback apparatus, a user can visually recognize a spectrum (frequency characteristics) of a playback sound in real time while listening to the playback sound from a speaker or a headphone. Hence, in general, even when the user cannot detect a spectrum of a playback sound clearly with his/her sense of hearing, he/she can detect the spectrum (frequency characteristics) easily with his/her sense of sight, which makes it possible to attain an advantage that the user can readily process a playback sound into a sound having desired equalizer characteristics superimposed thereon, by manipulating the equalizer adjustment unit as needed.

However, as shown in FIG. 14, the conventional spectrum display unit merely displays a spectrum of a playback sound currently being played at a speaker or a headphone. In other words, the conventional spectrum display unit displays only an instantaneous spectrum (frequency characteristics) of a playback sound as fluctuations of the level within the audio frequency band.

For this reason, even when the user wishes to know the whole of the characteristics of one song of music from start to end by playing a music CD, it is difficult to know the characteristics as a whole by looking at an instantaneous spectrum (frequency characteristics) of a playback sound.

To give a more concrete example, a song of music has a portion referred to as "chorus" to strongly stir emotions in people, an introduction portion provided to highlight the "chorus" portion, an ending portion to leave lingering tones. etc., and words and music are written to organically mix these various characteristics, so that the song emotionally appeals to the user. However, there is a problem that the user cannot know these various characteristics of music as a whole by merely looking at an instantaneous spectrum (frequency characteristics) of a playback sound.

SUMMARY OF THE INVENTION

The present invention was devised to solve the conventional problems, and therefore, has an object to detect distinctive characteristics which music or the like has, thereby providing an amount of new information.

In order to achieve the above and other objects, a beat density detecting apparatus of the present invention is a beat density detecting apparatus for detecting characteristics of a beat density contained in a signal subject to audio playback, wherein: the number of occurrences of a change in amplitude at each predetermined frequency of the signal subject to audio playback is detected; and the detected number of occurrences with respect to an elapse of a playback time of the signal subject to audio playback is found as characteristics information of a beat density.

Also, the detected number of occurrences at each predetermined frequency may be multiplied by respective coefficients each having a predetermined value, and a sum of products may be found as the characteristics information of the beat density.

According to the beat density detecting apparatus of the present invention, not the instantaneous characteristics of a part of a signal subject to audio playback, but the characteristics of a relatively long period of the signal subject to audio playback, or the whole of the characteristics of the signal subject to audio playback are detected as the beat density, which is novel characteristics information.

Also, a beat density detecting apparatus of the present invention includes a display unit for displaying the characteristics information of the beat density corresponding to an elapse of an entire playback time of the signal subject to audio playback.

According to the beat density detecting apparatus of the present invention, by displaying the characteristics of a relatively long period of the signal subject to audio playback, or the whole of the characteristics of the signal subject to audio playback by the display unit, the characteristics of the signal subject to audio playback with an elapse of time are displayed as a whole.

An information playback apparatus of the present invention is an information playback apparatus, including the beat density detecting apparatus described above, for playing back information recorded in an information recording medium as the signal subject to audio playback, wherein: the beat density detecting apparatus finds the characteristics information of the beat density from the information recorded in the information recording medium.

According to the information playback apparatus of the present invention, while the information recorded in an information recording medium, for example, information of music or the like, is being played back, the characteristics information of the beat density contained in the information is detected.

Also, an information playback apparatus of the present invention may include playback elapsed time detecting device for detecting a current point at which the signal subject to audio playback is being played, and the display unit may display information of the current point detected by the playback elapsed time detecting device corresponding to the characteristics information of the beat density.

According to the information playback apparatus of the present invention, the current point at which the information recorded in an information recording medium (for example, information of music or the like) is being played back, may be displayed corresponding to the characteristics information of the beat density. Consequently, it has become possible to provide a guideline or the like to know the correspondence between the current point at which the information is being played back and the characteristics information of the beat density.

Further, in the information playback apparatus or the present invention, the beat density detecting apparatus multiplies said detected number of occurrences at each predetermined frequency by respective coefficients each having a predetermined value, and finds a sum of products as said characteristics information of beat density.

Moreover, the information playback apparatus of the present invention comprises a display unit for displaying said characteristics information of the beat density corresponding to an elapse of an entire playback time of said signal subject to audio playback.

BRIEF DESCRIPTION OF THE DRAWINGS

These and other objects and advantages of the present invention will become clear from the following description with reference to the accompanying drawings, wherein:

FIGS. 1(a) through 1(c) are views showing an arrangement as to an outward appearance of an audio editing apparatus according to an embodiment of the present invention.

FIG. 5 is a block diagram showing an arrangement of a beat detecting unit provided to the beat density analyzing unit.

FIGS. 6(a) through 6(f) are graphs explaining a function of the beat detecting unit.

DETAILED DESCRIPTION OF THE PREFERRED EMBODIMENTS

Figure 2:
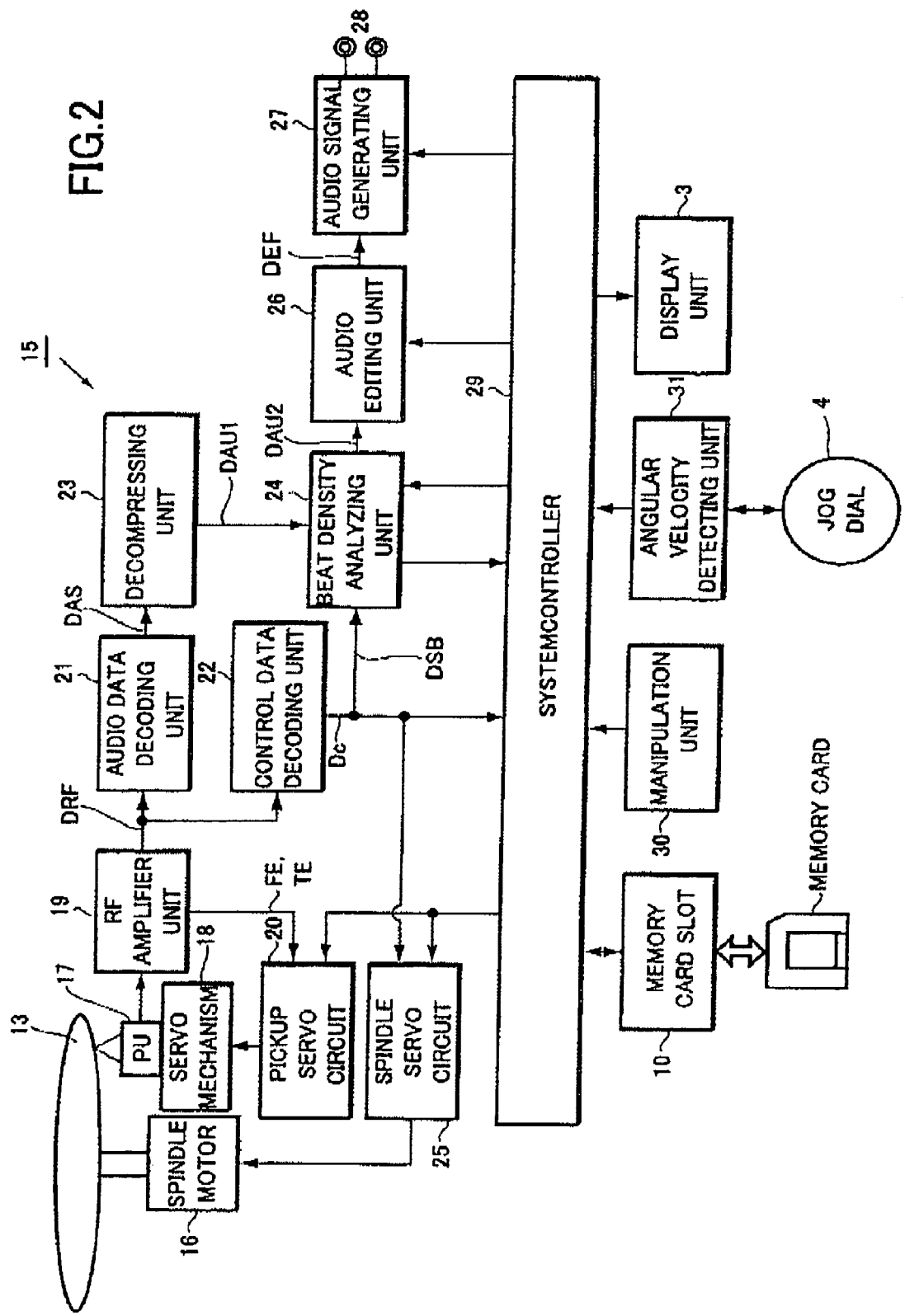
FIG. 2 is a block diagram showing an arrangement of a disc playback unit provided to the audio editing apparatus.

The following description will describe embodiments of the present invention with reference to the accompanying drawings. The present embodiment will describe an audio editing apparatus called an effecter as an information playback apparatus, and a beat density detecting apparatus provided to the audio editing apparatus.

FIGS. 1(a) through 1(c) are views showing an arrangement as to an outward appearance of an audio editing apparatus 1. FIG. 1(a) is a front view, FIG. 1(b) is a side view when viewed from the front, and FIG. 1(c) is a side view when viewed from a sideway.

Referring to FIG. 1(a), a manipulation surface 2 on the case of the audio editing apparatus 1 is provided with a display unit 3 composed of a liquid crystal display, a rotatable disc-wise jog dial 4, a plurality of manipulation keys 5a through 5h and 6a through 6f each formed from a push-pull type button switch, a plurality of manipulation keys 7a through 7f each formed from a rotatable rotary switch or a rotary variable resistor, and a plurality of manipulation keys 8a and 8b each formed from a sliding variable resistor. The manipulation keys 5a through 5h, 6a through 6f, 7a through 7f, 8a, and 8b together form a manipulation unit 30 that will be described below.

As shown in FIG. 1(b), a memory card slot 10 is formed at a side surface 9 of the case of the audio editing apparatus 1 when viewed from the front. The memory card slot 10 has a slit-wise opening portion for inserting and removing a reattachable memory card incorporating a semiconductor memory. Further, as shown in FIG. 1(c), a slit-wise disc insertion opening 14 for inserting and removing a CD or a DVD (hereinafter, referred to as an optical disc) 13 is formed at a side surface 12 of the case of the audio editing apparatus 1 when viewed from a sideway.

When the optical disc 13 is inserted into the disc insertion opening 14, an auto-loading mechanism (not shown) provided at the back of the disc insertion opening 14 automatically activates, and transports the optical disc 13 to a predetermined clamping position so as to be placed into a hub unit (not shown) provided to a driving axis of a spindle motor 16 described below. Then, of all the manipulation keys 5a through 5h, the predetermined manipulation key 5a is depressed, whereupon the spindle motor 16 starts to rotate in a predetermined direction, and a disc playback unit 15 (see FIG. 2) described below starts to play back data recorded in the optical disc 13.

When the depressed manipulation key 5a is pressed again, the spindle motor 16 stops rotating, whereupon the disc playback unit 15 stops playing the optical disc 13. Further, the auto-loading mechanism becomes an unloading condition, and transports the optical disc 13 placed in the clamping position to the outside of the disc insertion opening 14.

The jog dial 4 is provided to variably set a playback speed and a playback direction when the disc playback unit 15 plays back the data recorded in the optical disc 13.

Although the detailed functions of the jog dial 4 will be described below, when the user or the like manipulates the jog dial 4 by changing its rotational direction and rotational speed as needed, a user or the like can set a forward playback and a reverse playback according to the rotational direction, and further, he/she can change the tone of a playback sound played at a speaker or a headphone according to the rotational speed.

The forward playback referred to herein means to play back the data from the optical disc 13 in the order of the recording in the same manner when music or the like is played by rotating an analog record, such as an LP record, in the forward direction. Hence, in response to the manipulation to rotate the jog dial 4 clockwise, the disc playback unit 15 performs the forward playback and plays music or the like as a normal sound. The forward playback is also performed when the jog dial 4 is at rest.

On the other hand, the reverse playback referred to herein means to play back the data from the optical disc 13 in the reverse order of the recording in the same manner when music or the like is played by rotating an analog record in the reverse direction. In other words, because music or the like is recorded continuously (analog recording) in an analog record, when the analog record is rotated in the reverse direction, the music or the like is played in the reverse direction as an imitation sound, which is different from the original music or the like. Similarly, when the jog dial 4 is manipulated to rotate counterclockwise, the disc playback unit 15 plays back the individual data that are digitally recorded in the optical disc 13 in the reverse order, thereby producing a similar imitation sound as if an analog record were played in the reverse direction.

By providing the function equivalent to the reverse playback of an analog record, it is possible to, for example, produce an imitation sound called a scratching sound (an imitation sound, such as "squeaking" and "rattling") as the user rapidly manipulates the jog dial 4 to rotate it clockwise and counterclockwise repetitively in a reciprocating manner. When a player called a disc jockey manipulates the jog dial 4 to produce the scratching sounds or the like, he/she can produce rap music or the like by editing music from a CD or a DVD.

The manipulation keys 5b through 5h are provided to instruct the disc playback unit 15 on applying various kinds of modulation processing to playback data.

For example, when the manipulation key 5b is depressed, the disc playback unit 15 modulates playback data with a sawtooth wave. Also, when the manipulation key 5c is depressed, the disc playback unit 15 modulates the playback data with a rectangular wave, and when the manipulation key 5d is depressed, the disc playback unit 15 modulates the playback data to trigger the Doppler effect. When the manipulation key 5e is depressed, the disc playback unit 15 modulates the playback data with a special waveform that imitates a sound of a jet plane, and when the manipulation key 5f is depressed, the disc playback unit 15 modulates the playback data with a special waveform that imitates a sound of a gunshot. When the manipulation keys 5g and 5h are depressed, the disc playback unit 15 modulates the playback data with various kinds of special waveforms that the user has set in advance.

Accordingly, when the user manipulates the manipulation keys 5b through 5h as needed and specifies the desired modulation method for the playback data, he/she can perform edits (effects) to impart various sound effects to an original playback sound. Further, when the user manipulates the jog dial 4 to change the rotational direction and the rotational speed in various manners, he/she can perform more diversified edits with the manipulation keys 5b through 5h and the jog dial 4.

Like the manipulation keys 5b through 5h, the manipulation keys 6a through 6f, 7a through 7f, 8a, and 8b are provided to allow the disc playback unit 15 to perform edits (effects) in response to a manipulation command from the user.

Next, the following description will describe, with reference to FIG. 2, an arrangement of the disc playback unit 15 provided within the case of the audio editing apparatus 1.

Referring to FIG. 2, the spindle motor 16 that rotates the optical disc 13 in a predetermined direction is provided at the aforementioned clamping position. Provided in the vicinity of the spindle motor 16 are a pickup 17 and a servo mechanism 18. The pickup 17 optically reads data from the optical disc 13 and outputs a resulting readout signal. The servo mechanism 18 effects servo control so that the pickup 17 performs an adequate optical reading while moving in the direction of the radius of the optical disc 13 in a reciprocating manner.

Further, the disc playback unit 15 is provided with an RF amplifier unit 19 and a pickup servo circuit 20. When the RF amplifier unit 19 generates an error signal, such as a focus error signal FE and a tracking error signal TE, from a readout signal outputted from the pickup 17, the pickup servo circuit 20 effects feedback control onto the servo mechanism 18 to control the occurrence of an error, such as a focus error and a tracking error. Also, the pickup servo control 20 controls an operation of the servo mechanism 18 to move the pickup 17 to a recording track in the optical disc 13 as specified by a system controller 29.

Further, the RF amplifier unit 19 generates, in the form of an RF signal DRF, data recorded in the optical disc 13 from the readout signal outputted from the pickup 17, and supplies the same to an audio data decoding unit 21 and a control data decoding unit 22.

The audio data decoding unit 21 decodes the RF signal DRF according to a format standardized for each optical disc 13, isolates and extracts an audio stream DAS contained in the RF signal DRF, and supplies the same to a decompressing unit 23. Further, the decompressing unit 23 decompresses information in the audio stream DAS compressed according to the compression standards, such as the MPEG, AC-3, and MP3, and supplies decompressed playback data DAU1 to a beat density analyzing unit 24.

The control data decoding unit 22 decodes the RF signal DRF according to the format standardized for each optical disc 13, isolates and extracts control data Dc contained in the RF signal DRF, and supplies the same to the beat density analyzing unit 24, a spindle servo circuit 25, and the system controller 29.

At this point, TOC (Table of Contents) data recorded in a so-called lead-in area of the optical disc 13 and various kinds of control data, such as synchronizing data and sub-code data, recorded as being contained in the audio stream are isolated and extracted as the control data Dc, and the sub-code data DSB are supplied to the beat density analyzing unit 24, the synchronizing data are supplied to the spindle servo circuit 25, and all the control data Dc are supplied to the system controller 29.

The spindle servo circuit 25 detects an error in the synchronizing data with respect to a rotational speed of the spindle motor 16 specified by the system controller 29, and effects the feedback control onto rotations of the spindle motor 16 so as to control the occurrence of an error.

The beat density analyzing unit 24 generates pack data DPAK of a predetermined data structure having the sub-code data DSB supplied from the control data decoding unit 22 and the playback data DAU1 supplied from the decompressing unit 23 in a one-to-one correspondence, and generates novel information called "bit density" (hereinafter, referred to as "bit density data") from the pack data DPAK. Further, the beat density analyzing unit 24 stores the pack data DPAK in a ring buffer memory 32 described below to apply so-called batch processing, and at the same time, supplies the playback data DAU1 contained in the pack data DPAK to an audio editing unit 26 as playback data DAU2. In this manner, by applying the so-called batch processing at the beat density analyzing unit 24, it is possible to perform processing at the audio editing unit 26 independently or almost independently of the processing to playback the playback data DAU1 and the control data Dc from the optical disc 13.

The detailed arrangement of the beat density analyzing unit 24 will be described below with reference to FIGS. 3 through 8(*b*).

The audio editing unit 26 performs effects processing (edits processing) to impart various sound effects by modulating the playback data DAU2 supplied from the beat density analyzing unit 24 in various manners as described above. In other words, when the user or the like specifies the desired modulation method by manipulating the manipulation keys 5*b* through 5*h*, 6*a* through 6*f*, 7*a* through 7*f*, 8*a*, and 8*b*, and the jog dial 4 shown in FIG. 1, the audio editing unit 26 performs the effects processing to impart various imitation sounds, such as "a sound of a jet plane", "a sound of a gunshot", and "scratching sounds", by modulating the playback data DAU2 according to the specified modulation method, and supplies the data DEF which have undergone the effects processing (hereinafter, referred to as the effect data) to an audio signal generating unit 27.

The audio signal generating unit 27 outputs the effect data DEF directly in the form of digital data or converts the effect data DEF into an analog audio signal in the audio frequency band by a digital-to-analog converter (not shown) to be outputted to an audio output terminal 28, thereby allowing a playback sound to be sounded from a speaker, a headphone, etc. connected to the audio output terminal 28 in the end.

The system controller 29 is provided with a microprocessor (MPU), and performs central control of the operations of the overall audio editing apparatus 1 by executing a preset system program.

Also, the display unit 3, the memory card slot 10, and the manipulation unit 30 are connected to the system controller 29, so that the system controller 29 controls a display operation of the display unit 3 and sends/receives data to/from a memory card inserted into the memory card slot 10. Further, the system controller 29 inputs command data from the manipulation keys 5*a* through 5*h*, 6*a* through 6*f*, 7*a* through 7*f*, 8*a*, and 8*b* provided to the manipulation unit 30 to control the disc playback unit 15 according to the command data.

Moreover, an angular velocity detecting unit 31 is connected to the system controller 29. The angular velocity detecting unit 31 is provided with a rotary encoder circuit for detecting a rotational direction and a rotational speed (angular velocity) of the jog dial 4.

The angular velocity detecting unit 31 optically detects the rotational direction and the rotational speed of the jog dial 4 by means of the rotary encoder circuit, and supplies the detected data to the system controller 29. Consequently, the system controller 29 recognizes a manipulation quantity of the jog dial 4 which the user has manipulated, and allows the audio editing unit 26 to perform the effects processing depending on the manipulation quantity.

Although the details will be described below, when a manipulation quantity of the jog dial 4 comes very close to exceed a recoding capacity of the ring buffer memory 32 provided to the beat density analyzing unit 24, the system controller 29 directs the pickup servo circuit 20 and the spindle servo circuit 25 to move the pickup 17 so that it reads out data from the optical disc 13 in updating the pack data DPAK currently stored in the ring buffer memory 32 to other pack data DPAK.

Next, the following description will describe an arrangement and an operation of the beat density analyzing unit 24 with reference to FIGS. 3 through 8(*b*).

Figure 3:
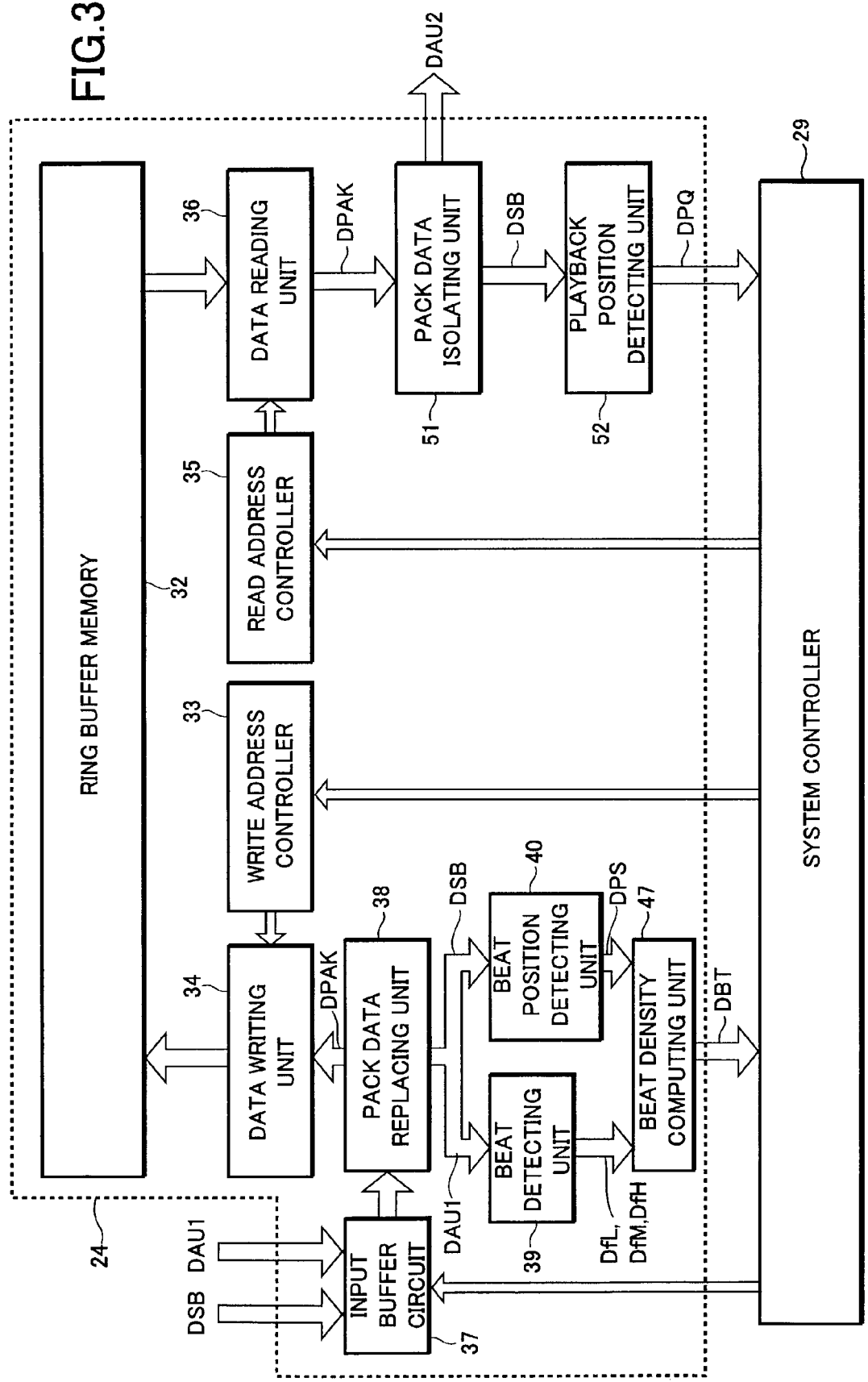
FIG. 3 is a block diagram showing an arrangement of a beat density analyzing unit provided to the disc playback unit.

Referring to FIG. 3, the beat density analyzing unit 24 is provided with the ring buffer memory 32, a write address controller 33, a data writing unit 34, a read address controller 35, and a data reading unit 36. The ring buffer memory 32 is formed from a non-volatile semiconductor memory having a predetermined memory capacity. The write address controller 33 sets a write address specified by the system controller 29. The data writing unit 34 writes the pack data DPAK at an address in the ring buffer memory 32 set by the write address controller 33. The read address controller 35 sets a read address specified by the system controller 29. The data reading unit 36 reads out the pack data DPAK from an address in the ring buffer memory 32 set by the read address controller 35.

Figure 4:
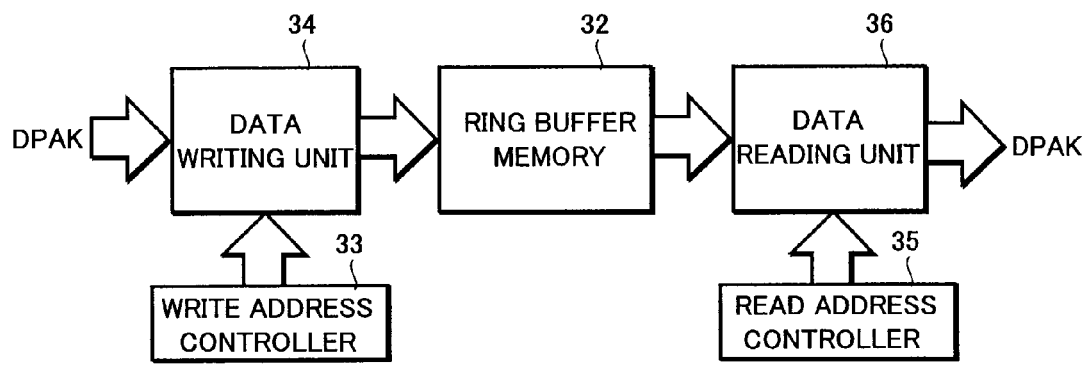
FIGS. 4(a) through 4(d) are explanatory views explaining an arrangement and a function of a ring buffer memory provided to the beat density analyzing unit.
Figure 4:
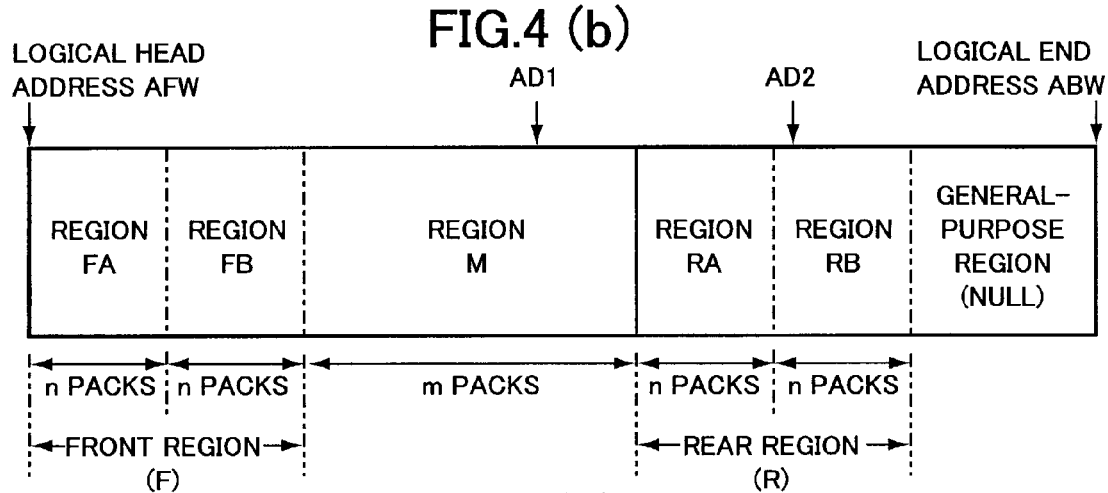
Figure 4:
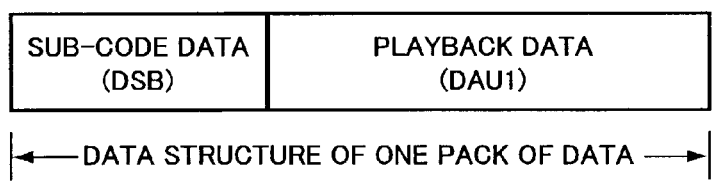
Figure 4:
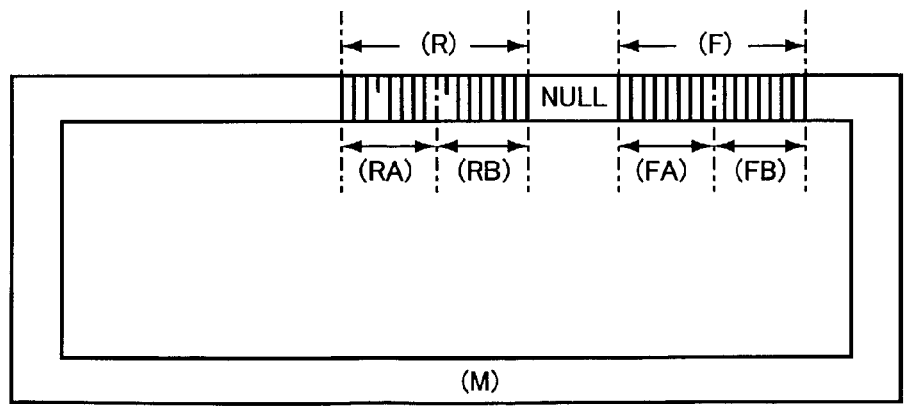

Hence, as shown in FIG. 4(*a*), the ring buffer memory 32 stores the pack data DPAK under the control of the write address controller 33 and the data writing unit 34, and outputs the pack data DPAK thus stored under the control of the read address controller 35 and the data reading unit 36, thereby controlling the writing and the reading at different timings, which makes the aforementioned batch processing possible.

To be more specific, the ring buffer memory 32 is composed of, for example, a 64-Mbyte SDRAM, and as shown in FIG. 4(*b*), a front region F. a main memory region M, a rear region R, and a general-purpose region NULL are allocated in a data memory region from a logical head address AFW to a logical end address ABW. The front region F is composed of two regions FA and FB each storing n pack data DPAK, and the rear region R is composed of two regions RA and RB each storing n pack data DPAK. The main memory region M is set with a memory capacity for storing predetermined m pack data DPAK, and the general-purpose region NULL is set with a memory capacity for storing an arbitrary number of pack data DPAK.

The ring buffer memory 32 is handled as an endless memory with the logical head address AFW being linked to the logical end address ABW, and therefore, it forms a logical structure that, as shown in FIG. 4(*d*), the regions RB and FA are respectively positioned at the both sides of the generalpurpose region NULL and the main memory region M resides between the regions FB and RA. Thus, the pack data DPAK are stored and read out so as not to break this logical structure under the control of the address controllers 33 and 35, the data writing unit 34, and the data reading unit 36.

In other words, the pack data DPAK are stored by setting addresses relatively in the regions F, M, R. and NULL on the condition that the logical structure shown in FIGS. 4(*b*) and (*d*) will not be broken. It should be noted, however, that no pack data DPAK are stored in the general-purpose region NULL, so that it can function as a buffer region.

Further, the beat density analyzing unit 24 is provided with a pack data replacing unit 38 for inputting the sub-code data DSB from the control data decoding unit 22 and the playback data DAU1 from the decompressing unit 23 both shown in FIG. 2 through an input buffer circuit 37 at predetermined timing specified by the system controller 29.

As shown in FIG. 4(*c*), the pack data replacing unit 38 generates the pack data DPAK having the sub-code data DSB and the playback data DAU1 corresponding to the sub-code data DSB in a one-to-one correspondence. In other words, the pack data replacing unit 38 detects a Q sub-code indicating an elapsed track time of the playback data DAU1 from the sub-code data DSB, and brings the playback data DAU1 corresponding to the detected Q sub-code and the sub-code data DSB into a one-to-one correspondence, whereby it replaces data needed to generate the pack data DPAK shown in FIG. 4(*c*). Then, the pack data replacing unit 38 successively supplies the pack data DPAK thus generated to the data writing unit 34 to be stored into the ring buffer memory 32.

Also, the pack data replacing unit 38 supplies the playback data DAU1 in the pack data DPAK to a beat detecting unit 39, and the sub-code data DSB in the pack data DPAK to a beat position detecting unit 40.

The beat detecting unit 39 is arranged in the manner shown in FIG. 5, and is provided with three band filters 41a, 41b, and 41c, which are formed from digital filters and respectively set to three frequency bands defined by dividing an audio frequency band into high, medium, and low frequency bands.

The band filter 41a is set as a pass band for a low frequency band in the audio frequency band, and allows the passing of frequency components in the low frequency band of the playback data DAU1, thereby supplying low frequency band data DFL shown in FIG. 6(a) as an example to a peak level detecting unit 42a.

The band filter 41b is set as a pass band for a medium frequency band in the audio frequency band, and allows the passing of frequency components in the medium frequency band of the playback data DAU1, thereby supplying medium frequency band data DFM shown in FIG. 6(c) as an example to a peak level detecting unit 42b. The band filter 41c is set as a pass band for a high frequency band in the audio frequency band, and allows the passing of frequency components in the high frequency band of the playback data DAU1, thereby supplying high frequency band data DFH shown in FIG. 6(e) as an example to a peak level detecting unit 42c.

The peak level detecting units 42a, 42b, and 42c respectively output peak detection data DPL, DPM, and DPH shown in FIGS. 6(b), 6(d), and 6(f), from the data DFL, DFM, and DFH shown in FIGS. 6(a), 6(c), and 6(e), by subjecting the low frequency band data DFL, the medium frequency band data DFM, and the high frequency band data DFH to peak detection, and supplies the peak detection data DPL, DPM, and DPH to comparing units 43a, 43b, and 43c, respectively.

Figure 7:
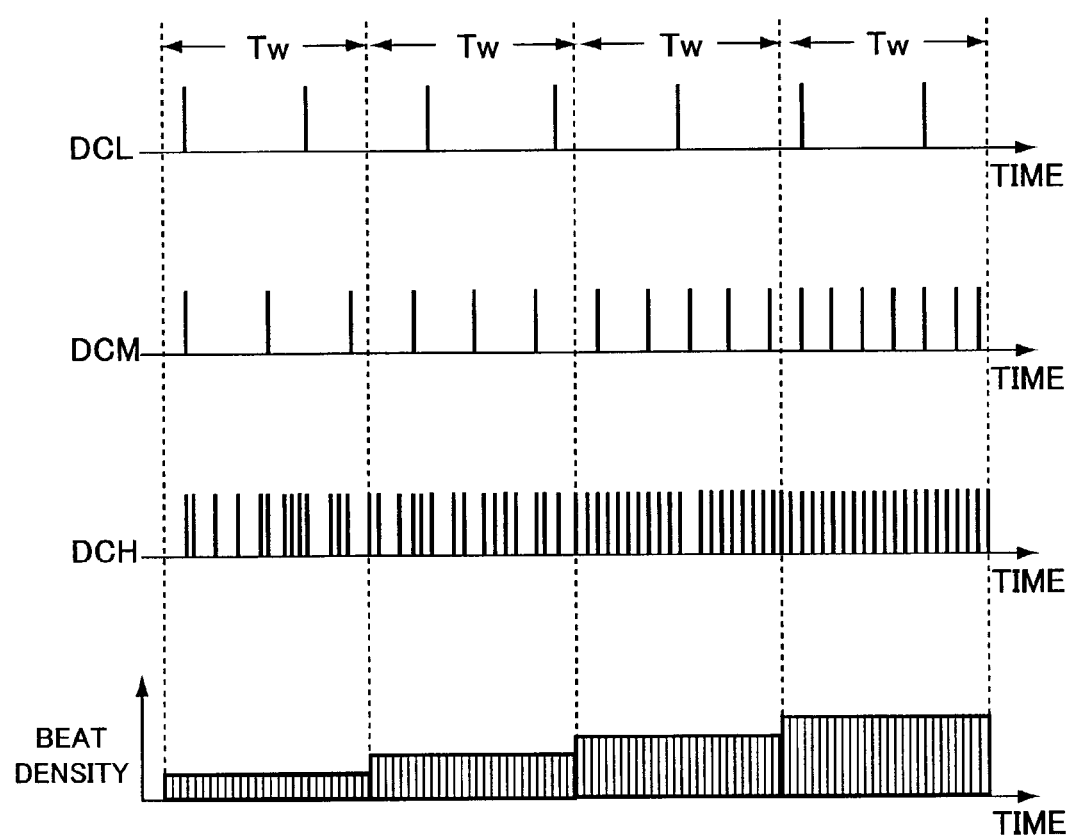
FIG. 7 is a graph further explaining the function of the beat detecting unit.

The comparing units 43a, 43b, and 43c compare threshold data THDL, THDM, THDH at their respective predetermined levels supplied from threshold level setting units 44a, 44b, and 44c with the peak detection data DPL, DPM, and DPH, respectively, and upon detection of a level larger than the threshold data THDL, THDM, and THDH, they generate binary logical data DCL, DCM, and DCH from the peak detection data DPL, DPM, and DPH, and supplies the same to counting units 45a, 45b, and 45c, respectively. Each of the counting units 45a, 45b, and 45c is composed of a digital counter, and as shown in FIG. 7, the counting units 45a, 45b, and 45c count the logical data DCL, DCM, and DCH generated within a predetermined period Tw set successively by a time window setting unit 46, and respectively output count value data DfL, DfM, and DfH as the count results to a beat density computing unit 47.

As has been discussed, the beat detecting unit 39 detects the low frequency components, the medium frequency components, and the high frequency components in the playback data DAU1, and outputs the count value data DfL, DfM, and DfH for the respective frequency bands. In other words, the beat detecting unit 39 generates the count value data DfL indicating the number of occurrences of the peak components generated in the low frequency components. The count value data DfM indicating the number of occurrences of the peak components generated in the medium frequency components, and the count value data DfH indicating the number of occurrences of the peak components generated in the high frequency components. In the present invention, the count value data DfL, DfM, and DfH are defined as novel characteristics as follows: the count value data DfL represents the characteristics of a beat density in the low frequency band of the playback data DAU1, the count value data DfM represents the characteristics of a beat density in the medium frequency band of the playback data DAU1, and the count value data DfH represents the characteristics of a beat density in the high frequency band of the playback data DAU1.

Referring to FIG. 3 again, the beat position detecting unit 40 detects an elapsed track time during the playback from the Q sub-code contained in the sub-code data DSB, and outputs the detected elapsed track time to the beat density computing unit 47 as beat position data DPS.

The beat density computing unit 47 inputs the beat position data DPS and the count value data DfL, DfM, and DfH, and judges an elapsed track time when the count value data DfL, DfM, and DfH are generated based on the beat position data DPS. Then, the beat density computing unit 47 finds beat density data DBT per elapsed track time in accordance with Equation (1) below, and supplies the beat density data DBT to the system controller 29:

$$DBT = (\beta L \times DfL) + (\beta M \times DfM) + (\beta H \times DfH) \quad (1).$$

By performing the above computation, it is possible to find the beat density data DBT with respect to the elapsed track time as shown in FIG. 7 at the bottom.

In Equation (1) above, coefficients $\beta L$, $\beta M$, and $\beta H$ are set to values that allow the characteristics of the beat density to be extracted properly for each genre of music, such as rock, jazz, pops, and Latin. In fact, these coefficients have been found experimentally. Further, by manipulating the manipulation unit 30 the user can selectively specify each of the coefficients $\beta L$, $\beta M$, and $\beta H$ for respective genres of music or set the coefficients $\beta L$, $\beta M$, and $\beta H$ to arbitrary values independently of the genre of music.

Also, by manipulating the manipulation unit 30 the user can adjust the pass frequency band for each of the band filters 41a, 41b, and 41c or adjust the period Tw of the time window set by the time window setting unit 46.

Then, upon input of the beat density data DBT, the system controller 29 supplies the beat density data DBT corresponding to the elapsed track time to the display unit 3, so that the beat density data DBT with respect to the elapsed track time are displayed.

Here, an explanation will be given to one example of a display mode of the display density data DBT on the display unit 3 with reference to FIGS. 8(a) and 8(b).

The display unit 3 is provided with a video memory (not shown) for storing the beat density data DBT and various kinds of display data, so that it can display a motion picture and a still image.

As shown in FIG. 8(a), a display region of the display unit 3 is provided with a beat density display area 48, an elapsed track time display area 49, an associated information display area 50, etc. The beat density display area 48 displays individual beat density data DBT per elapsed track time in the form of a longitudinal bar chart with the horizontal axis representing the elapsed track time and the vertical axis representing the beat density data DBT. The elapsed track time display area 49 displays the current elapsed track time in the form of a horizontally expandable bar chart. The associated information display area 50 is provided for displaying a song title of music and an artist name extracted from the TOC data.

Figure 8:
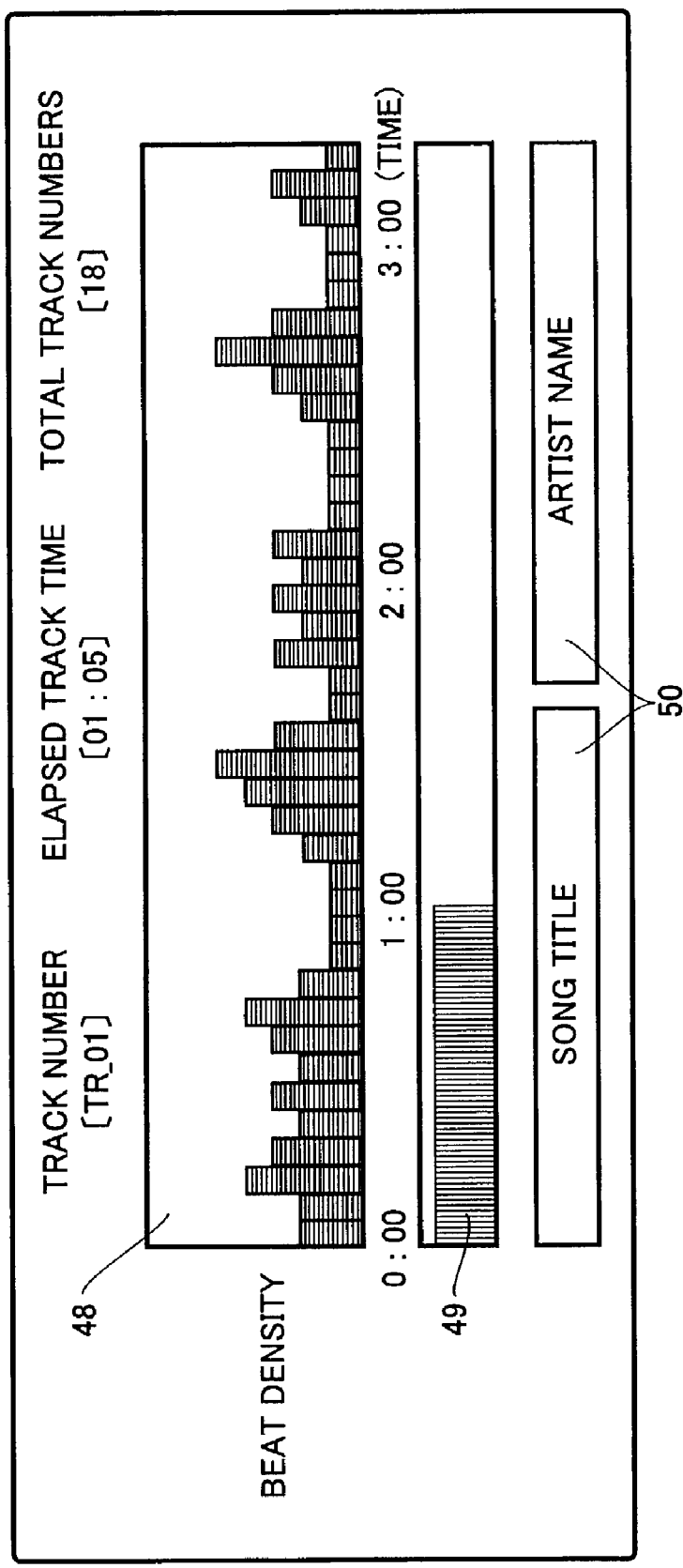
FIGS. 8(a) and 8(b) are views showing display modes of a display unit.
Figure 8:
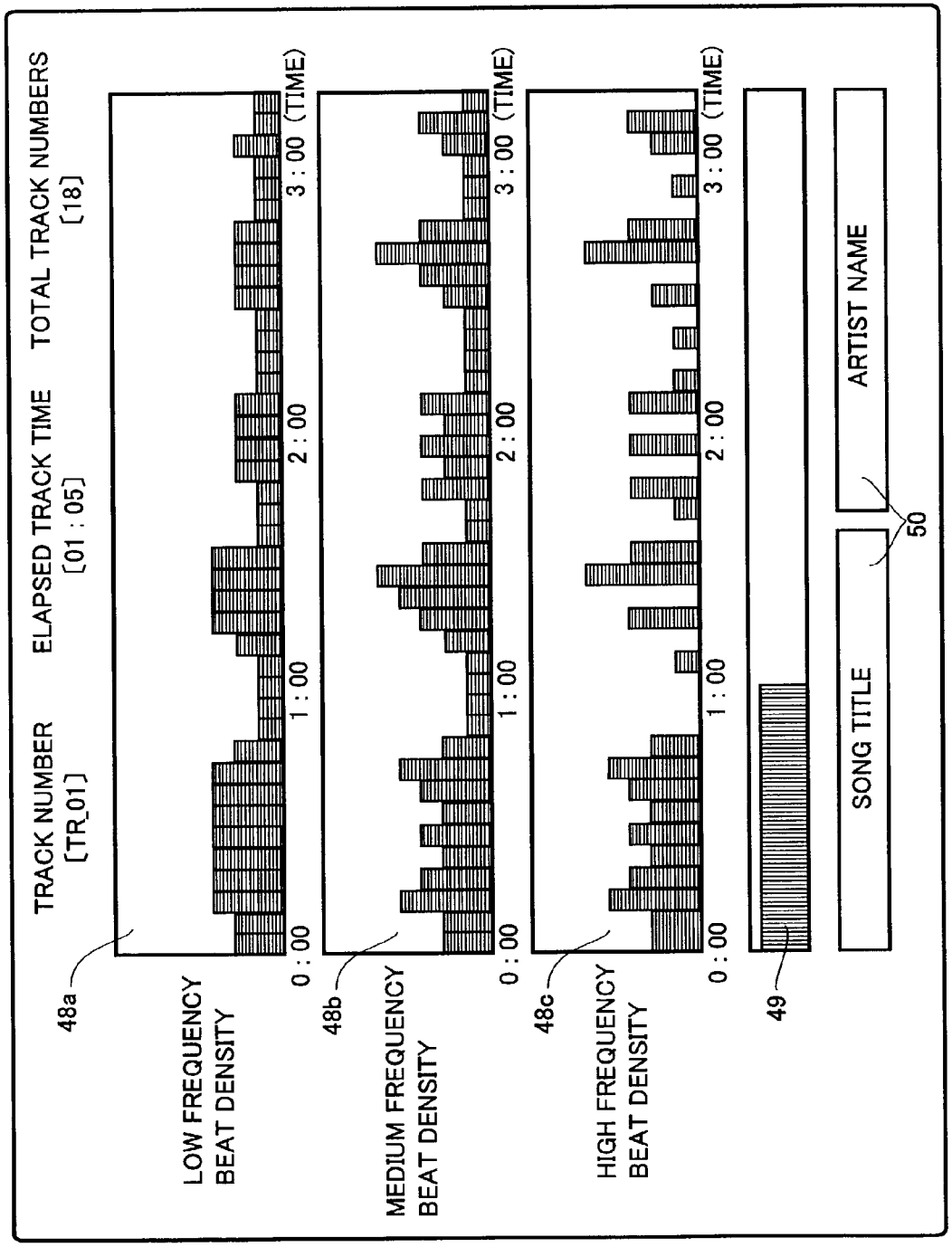

For example, when music recorded in a music CD is played, the beat density data DBT for one song of music are found by the beat density computing unit 47, and the whole of the beat density data DBT for that song are displayed on the beat density display area 48 corresponding to the elapsed track time. FIG. 8(*a*) shows a case where one song is approximately three minutes long.

The elapsed track time display area 49 displays the elapsed track time at the point when a playback sound is outputted from a speaker or a headphone. In other words, the pack data DPAK stored in the ring buffer memory 32 are read out by means of the data reading unit 36, and the current elapsed track time is found from the sub-code data DSB (in particular, from the Q sub-code) contained in the pack data DPAK when a playback sound is played to sound a speaker or a headphone. Then, the elapsed track time at that point is converted into a length of the bar chart corresponding to the horizontal axis (time) of the beat density display area 48 and is displayed on the elapsed track time display area 49.

Also, the upper area of the beat density display area 48 displays the track number at which the music being played is recorded, a numerical display for digitally displaying the current elapsed track time, and the total track numbers indicating the number of all songs recorded in the optical disc 13. Hence, the user or the like can readily understand the contents of the optical disc 13 by merely looking at these displays, the displays on the beat density display area 48, the elapsed track time display area 49, the associated information display area 50, etc.

In particular, when the user compares the length of the bar chart displayed on the elapsed track time display area 49 with the beat density data DBT displayed on the beat density display area 48, he/she can readily judge as to how long it will be until the characteristic portion (for example, the "chorus" portion) of the currently played music is played back.

FIG. 8(*a*) shows a display mode when the beat density data DBT found in accordance with Equation (1) above are displayed. However, as shown in FIG. 8(*b*), it may be arranged in such a manner that three beat density display areas 48*a*, 48*b*, and 48*c* are provided, so that the beat density display area 48*a* displays the beat density ($\beta L \times DfL$) at the low frequency characterized by the first term in the right side of Equation (1), the beat density display area 48*b* displays the beat density ($\beta M \times DfM$) at the medium frequency characterized by the second term in the right side of Equation (1), and the beat density display area 48*c* displays the beat density ($\beta H \times DfH$) at the high frequency characterized by the third term in the right side of Equation (1).

Referring to FIG. 3 again, a pack data isolating unit 51 and a playback position detecting unit 52 are provided subsequent to the data reading unit 36 described above.

The pack data isolating unit 51 is supplied with the pack data DPAK read out from the ring buffer memory 32 by means of the data reading unit 36, and isolates the sub-code data DSB and the playback data DAU1 contained in the pack data DPAK. Then, the pack data isolating unit 51 supplies the sub-code data DSB to the playback position detecting unit 52, and supplies the playback data DAU1 to the audio editing unit 26 shown in FIG. 2 as the playback data DAU2 for generating a playback sound.

The playback position detecting unit 52 detects the elapsed track time at the point (current point) when the playback data DAU2, having been processed by the audio editing unit 26 and the audio signal generating unit 27, are finally played as a playback sound at a speaker or a headphone by extracting the Q sub-code in the sub-coded data DSB, and supplies the elapsed track time data DPQ thus detected to the system controller 29.

By providing the elapsed track time data DPQ to the display unit 3 by means of the system controller 29, it is possible to display the current elapsed track time as the length of the bar chart on the elapsed track time display area 49 shown in FIGS. 8(*a*) and 8(*b*).

Figure 9:
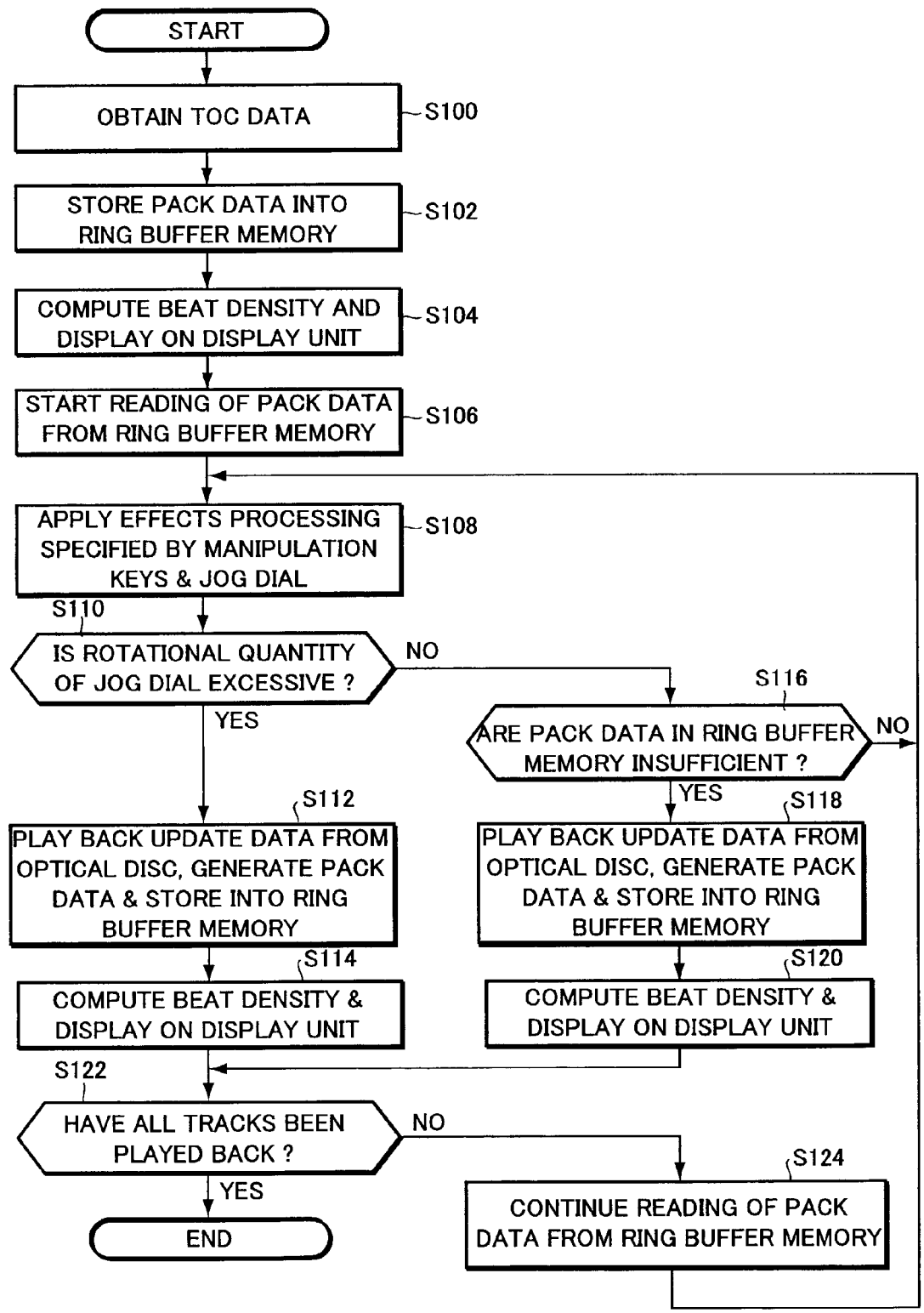
FIG. 9 is a flowchart detailing an operation of the audio editing apparatus.

Next, the following description will describe an operation of the audio editing apparatus 1 arranged as described above with reference to FIGS. 9 through 13(*b*). FIG. 9 is a flowchart detailing an operation of the audio editing apparatus 1, and FIGS. 10(*a*) through 13(*b*) are explanatory views showing the operation of the ring buffer memory 32.

Referring to FIG. 9, when the user inserts the optical disc 13 through the disc insertion opening 14 and specifies to start the playing from the manipulation unit 30, the disc playback unit 15 starts a playback operation under the control of the system controller 29.

Initially, in Step S100, the spindle motor 16 and the pickup 17 are activated, and the TOC data are read out from the lead-in area in the optical disc 13, so that the system controller 29 obtains the TOC data through the control data decoding unit 22.

Then, the data reading from a so-called program area (area where audio data and the like are recorded) in the optical disc 13 is started, and data are read out until the front region F, the main region M, and the rear region R in the ring buffer memory 32 become full. Further, during this reading, the pack data replacing unit 38 generates the pack data DPAK by bringing the sub-code data DSB and the playback data DAU1 contained in the successively read out data in a one-to-one correspondence, and stores the pack data DPAK successively into the front region F, the main region M, and the rear region R in the ring buffer memory 32. More specifically, as shown in FIG. 4(*b*), ($2 \times n + m + 2 \times n$) pack data DPAK are stored from the region F to the rear region R.

Further, in Step S104, while the pack data DPAK are generated and stored into the ring buffer memory 32, the beat detecting unit 39 generates the count value data DfL, DfM, and DfH indicating the beat densities in their respective low, medium, and high frequency bands for each period Tw of the predetermined time window and supplies the same to the beat density computing unit 47. Further, the beat position detecting unit 40 finds the beat position data DPS corresponding to each of the count value data DfL, DfM, and DfH, and supplies the same to the beat density computing unit 47. Then, the beat density computing unit 47 generates the beat density data DBT by performing a computation in accordance with Equation (1) above for each period Tw of the time window, and successively supplies the beat density data DBT thus computed to the system controller 29 corresponding to the beat position data DPS. Further, the system controller 29 supplies the beat density data DBT to the display unit 3.

Consequently, the display unit 3 is supplied with the beat density data DBT in numbers corresponding to the entire elapsed track time when a playback sound is played by successively reading out the ($2 \times n + m + 2 \times n$) pack data DPAK stored in the ring buffer memory 32 from head to end.

Then, the display unit 3 displays the beat density data DBT on the beat density display area 48.

When the optical disc 13 is inserted and the first ($2 \times n + m + 2 \times n$) pack data DPAK are stored in the ring buffer memory 32, only a part of the playback data DAU1 has been played back from the optical disc 13. Hence, not all the beat densities for one song as shown in FIG. 8(*a*) are displayed. In other words, only the beat densities for a time length equivalent to the (2×n+m+2×n) pack data DPAK are displayed.

Then, in Step S106, the reading of the pack data DPAK stored in the ring buffer memory 32 is started, and in Step S108, the audio editing unit 26 and the audio signal generating unit 27 start the effects processing and the processing to generate a playback sound, respectively. In other words, the effects processing specified by the jog dial 4 and the manipulation keys 5*b* through 8*b* is performed.

When the jog dial 4 is at rest at this point, the pack data DPAK are read out successively from the logical head address AFW shown in FIG. 4(*b*).

The readout timing of the pack data DPAK is set as follows. That is, when the pack data isolating unit 51 shown in FIG. 3 isolates the sub-code data DSB from the pack data DPAK, and further, the playback position detecting unit 52 also shown in FIG. 3 generates the elapsed time data DPQ from the sub-code data DSB and supplies the same to the system controller 29, the system controller 29 judges a point of the playback processing of a playback sound by the audio editing unit 26 and the audio signal generating unit 27. Then, the system controller 29 controls the read address controller 35 to set a read address in such a manner that an adequate playback sound is generated based on the so-called sampling theorem.

Further, the elapsed time data DPQ supplied from the playback position detecting unit 52 to the system controller 29 are also supplied to the display unit 3, and as shown in FIG. 8(*a*), the elapsed track time is displayed in the form of a bar chart on the elapsed track time display area 49.

On the other hand, when the jog dial 4 is manipulated to rotate, the read address controller 35 sets a read address in the ring buffer memory 32 according to the rotational direction and the rotational angle.

For example, when the jog dial 4 is rotated clockwise when an address AD1 in the main region M shown in FIG. 4(*b*) is set, the system controller 29 increments addresses depending on the angular velocity of the jog dial 4 from the address AD1 as the starting point, and the addresses set by the read address controller 35 successively shift toward the rear region R. In other words, under the forward playback condition, a playback sound is modulated in response to the rotational speed of the jog dial 4 in the clockwise direction and then outputted.

Also, when the jog dial 4 is rotated counterclockwise, the system controller 29 decrements addresses depending on the angular velocity of the jog dial 4 from the address AD1 as the starting point, and the addresses set by the read address controller 35 successively shift toward the front region F. Hence, the condition shifts to the reverse playback condition, and an imitation sound different from the original playback sound is outputted in response to the rotational speed of the jog dial 4 in the counterclockwise direction.

When the jog dial 4 is manipulated to rotate clockwise and counterclockwise in a reciprocating manner, the forward playback and the reverse playback are performed in turn, and a so-called scratching sound is played.

The memory capacity of each of the regions FA, FB, M, RA, and RB is set in advance to store more pack data DPAK than those equivalent to the general maximum rotational angle when the jog dial 4 is manipulated to rotate clockwise and counterclockwise in a reciprocating manner, so that the audio editing apparatus 1 can play the scratching sound described above. Hence, by reading out the pack data DPAK stored in the ring buffer memory 32 in response to the rotations of the jog dial 4, it is possible to play the scratching sound.

Then, in Step S110, the system controller 29 judges whether a rotation quantity of the jog dial 4 manipulated by the user becomes excessive in comparison with the pack data DPAK stored in the ring buffer memory 32.

The condition when the rotation quantity of the jog dial 4 becomes excessive means when the jog dial 4 is manipulated to rotate counterclockwise continuously to the extent that an address before the logical head address AFW in the front region F needs to be set, or when the jog dial 4 is manipulated to rotate clockwise continuously to the extent that an address after the logical end address ABW in the rear region R needs to be set.

When the rotation quantity of the jog dial 4 becomes excessive in comparison with the pack data DPAK stored in the ring buffer memory 32 as described above, the flow proceeds to Step S112, wherein new data are played back from the optical disc 13, and the ring buffer memory 32 is updated with the pack data DPAK generated from the newly played back playback data DAU1 and sub-code data DSB, thereby updating the currently stored pack data DPAK.

In case that the above update is performed because the jog dial 4 is manipulated to rotate clockwise excessively, the pack data DPAK stored in the rear region R are left intact, and the head address of the rear region R is changed to the post-update logical head address. In short, the rear region R is set as the post-update front region F.

Figure 10:
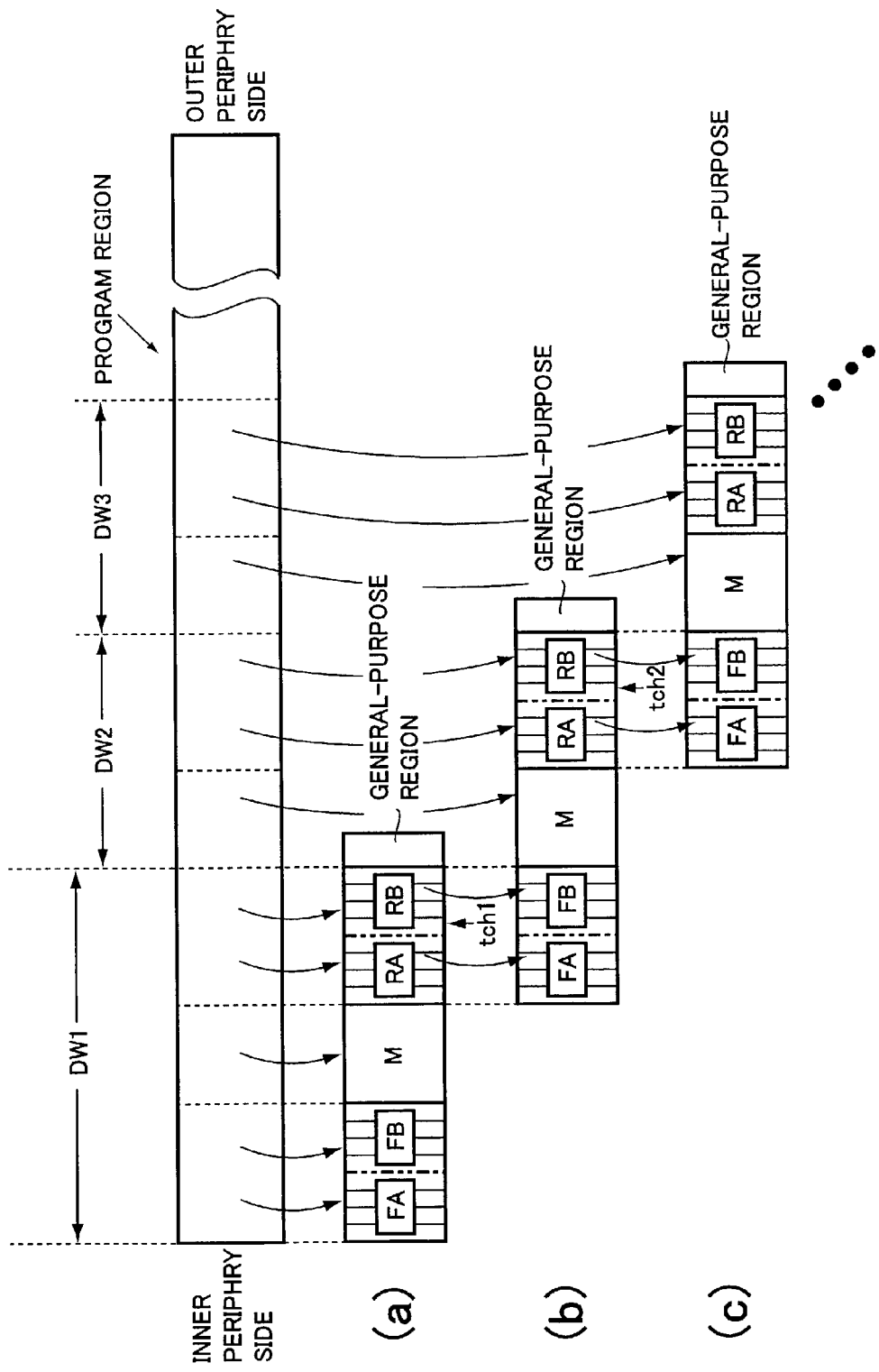
FIGS. 10(a) through 10(c) are views explaining update processing of pack data stored in the ring buffer memory.
Figure 11:
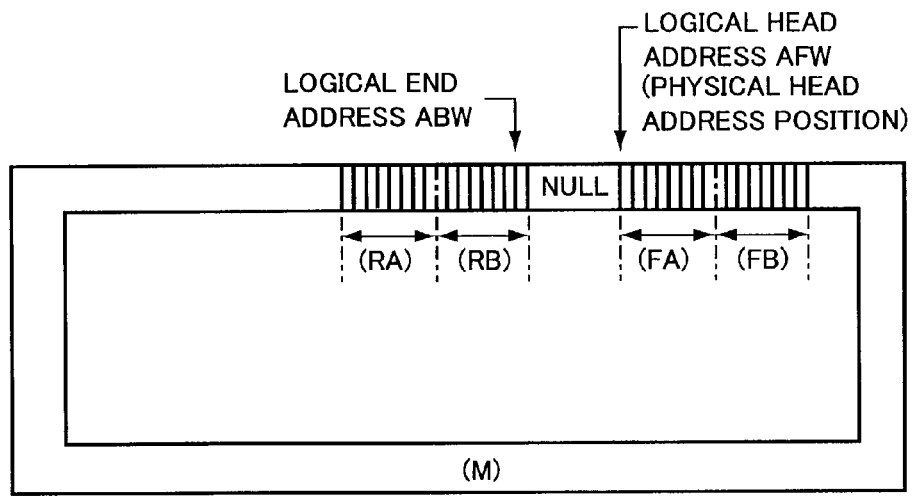
FIGS. 11(a) through 11(c) are views further explaining the update processing of the pack data stored in the ring buffer memory.
Figure 11:
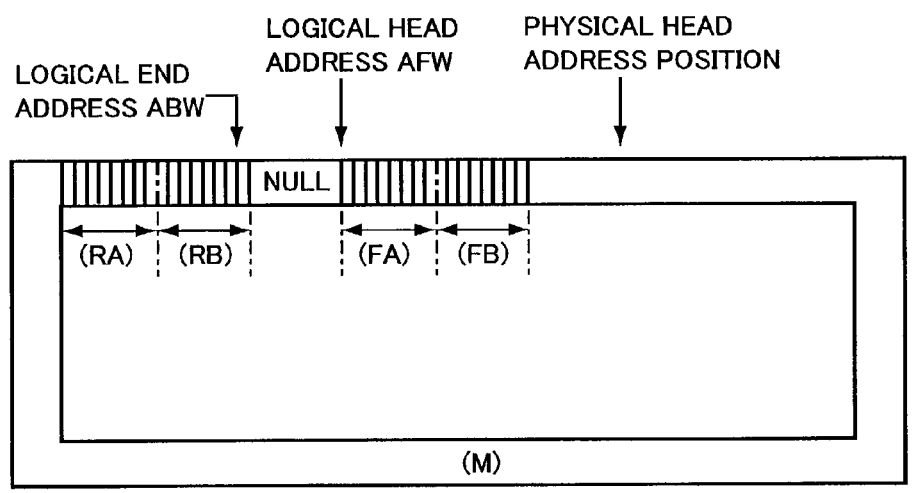
Figure 11:
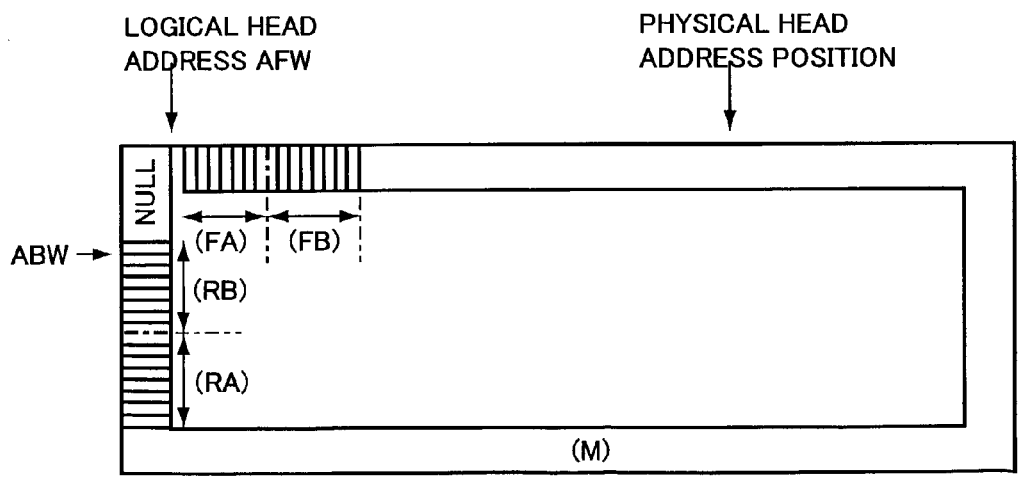

The following description will describe more in detail how the update processing is performed with reference to FIGS. 10(*a*) through 11(*c*). The uppermost diagram in FIG. 10 shows the program region in the optical disc 13. FIGS. 10(*a*) and 11(*a*) show a storage condition in the pre-update ring buffer memory 32. FIGS. 10(*b*) and 10(*c*) and FIGS. 11(*b*) and 11(*c*) show storage conditions in the post-update ring buffer memory 32.

Initially, as shown in FIGS. 10(*a*) and 11(*a*), the preupdate ring buffer memory 32 stores the pack data DPAK generated from the data read out from a segment DW1 in the optical disc 13. Assume that the jog dial 4 is manipulated to rotate clockwise excessively when an address tch1 in the region RB shown in FIG. 10(*a*) is set, then the update processing starts, whereby the pack data DPAK in the regions RA and RB shown in FIGS. 10(*a*) and 11(*a*) are updated to be the pack data DPAK in the post-update regions FA and FB as shown in FIGS. 10(*b*) and 11(*b*). Further, the pickup 17 starts to read update data, and the pack data DPAK generated from the read out data are successively overwritten from the end of the post-update regions FA and FB to be stored therein. Consequently, as shown in FIGS. 10(*b*) and 11(*b*), the post-update main region M and regions RA and RB are created subsequent to the post-update regions FA and FB.

Here, the pack data DPAK in the pre-update regions RA and RB are made into the pack data DPAK in the post-update regions FA and FB. Hence, the pickup 17 reads only the data needed to store the pack data DPAK in the post-update main region M and regions RA and RB, that is, the data in a segment DW2 in the optical disc 13 shown in FIG. 10, which makes it possible to accelerate the update processing.

When the update processing is performed in this manner, the pack data DPAK in the pre-update regions RA and RB are left intact in the post-update regions FA and FB, and therefore, even when the addresses are set successively from the address tch1 by the read address controller 36 and a playback sound is produced based on the read out pack data DPAK, the playback sound will be continual. Consequently, it is possible to provide a high-quality playback sound.

Also, assume that the jog dial 4 is manipulated to rotate clockwise excessively when an arbitrary address tch2 in FIG. 10(*b*) is set after the ring buffer memory 32 is updated as shown in FIGS. 10(*b*) and 11(*b*), then the update processing is performed in the same manner when the condition in FIGS. 10(*a*) and 11(*a*) is updated to the condition in FIGS. 10(*b*) and 11(*b*), whereby the ring buffer memory 32 is updated from the condition in FIGS. 10(*b*) and 11(*b*) to the condition in FIGS. 10(*c*) and 11(*c*). When the condition is updated to the condition in FIGS. 10(*c*) and 11(*c*), it is also possible to accelerate the update processing by allowing the optical pickup 17 to read only the data necessary to store the pack data DPAK in the post-update main region M and regions RA and RB, that is, the data in a segment DW3 in the optical disc 13 shown in FIG. 10. Further, because the pack data DPAK are left in the post-update regions FA and FB, it is possible to provide a high-quality playback sound.

When the jog dial 4 is manipulated to rotate counterclockwise excessively, the contents in the ring buffer memory 32 are updated by the processing opposite to the update processing performed when the jog dial 4 is manipulated to rotate clockwise excessively.

Figure 12:
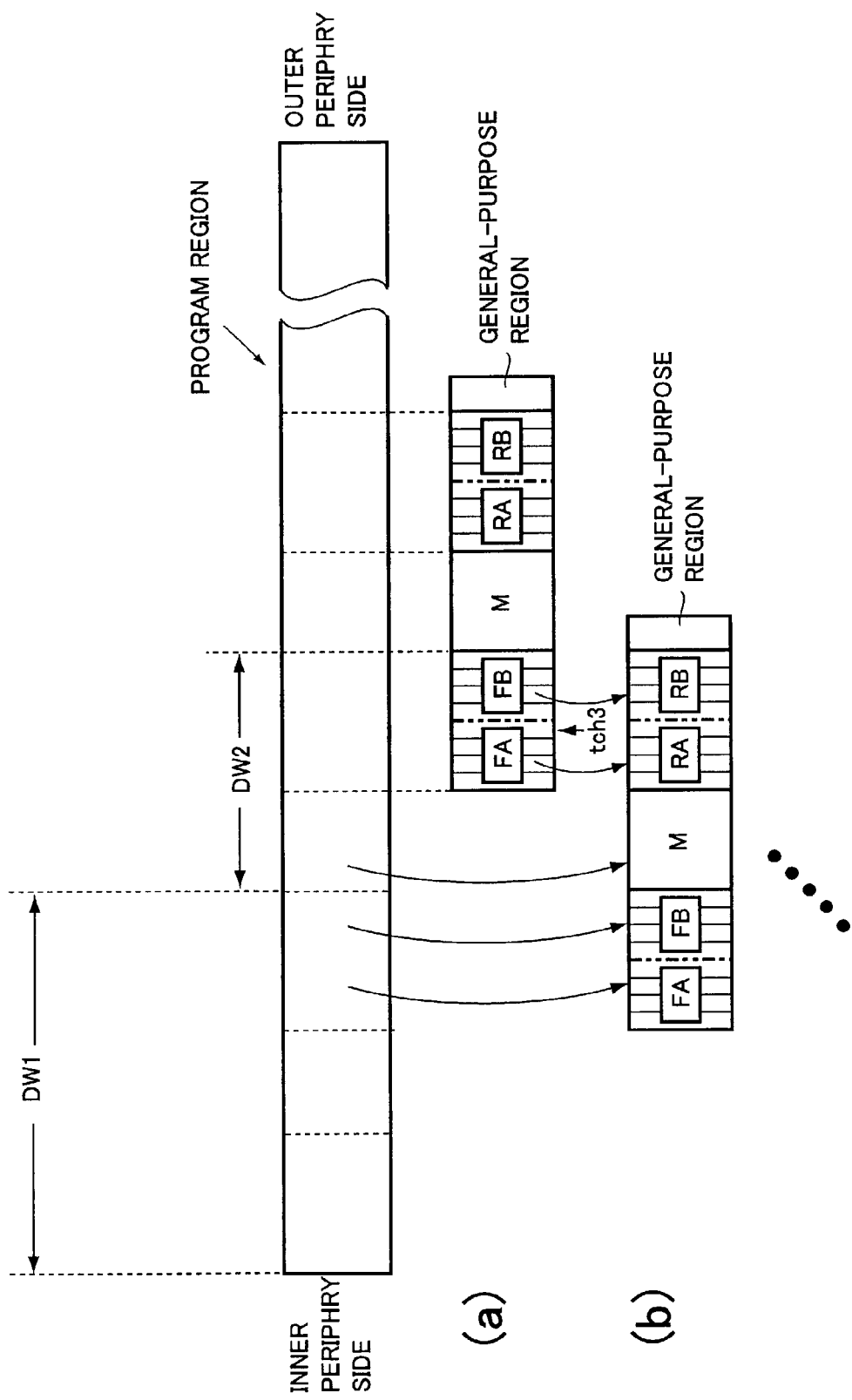
FIGS. 12(a) and 12(b) are views further explaining the update processing of the pack data stored in the ring buffer memory.
Figure 13:
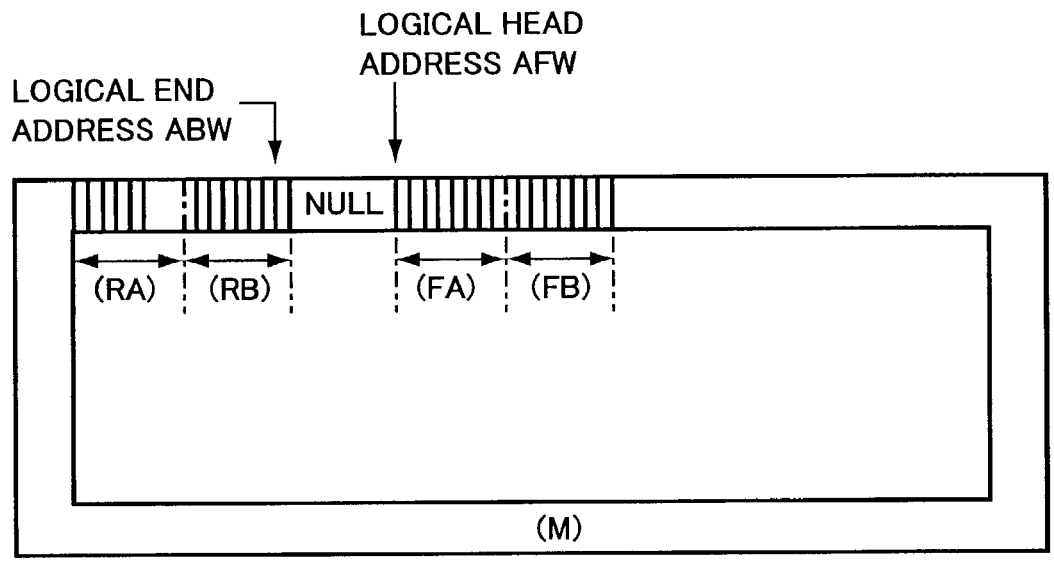
FIGS. 13(a) and 13(b) are views further explaining the update processing of the pack data stored in the ring buffer memory.
Figure 13:
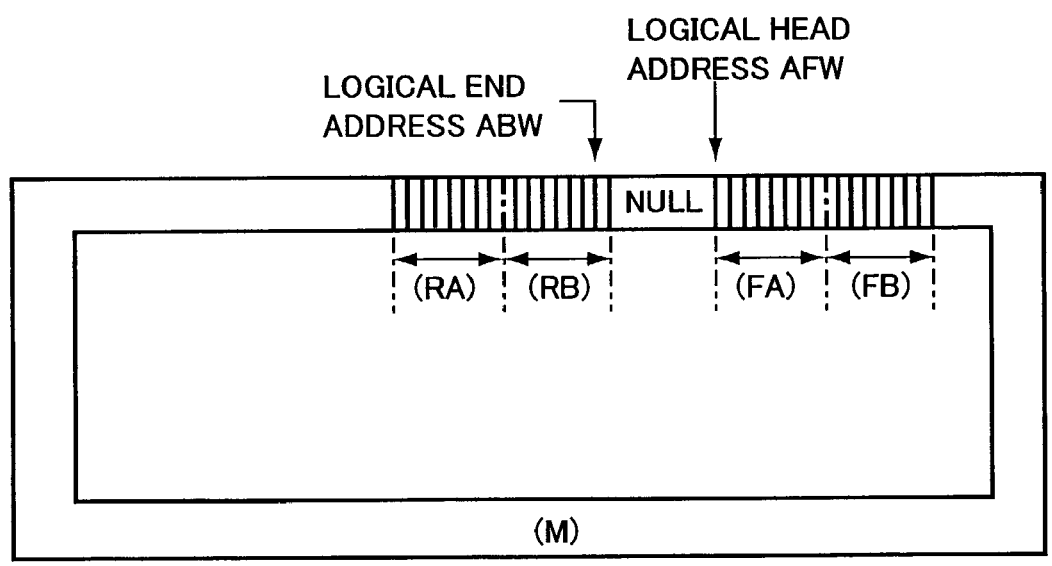
Figure 14:
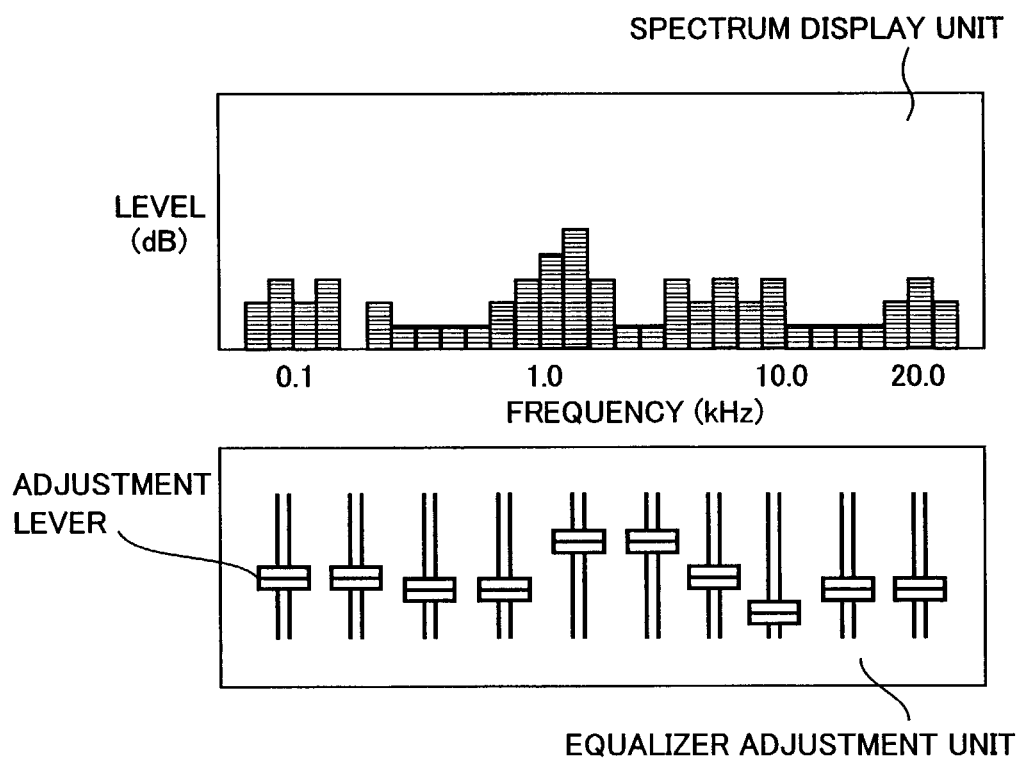
FIG. 14 is a view showing a display mode of a spectrum display unit provided to a conventional information playback apparatus.

For example, if the jog dial 4 is manipulated to rotate counterclockwise excessively when the contents in the ring buffer memory 32 are in the condition shown in FIGS. 12(*a*) and 13(*a*), the pack data DPAK stored in the regions FA and FB are left intact, and the regions FA and FB are updated to be the regions RA and RB while the general-purpose region NULL is set subsequent to the post-update regions RA and RB. Further, data needed to store the pack data DPAK in the post-update regions FA and FB and main region M are read out from the optical disc 13 and played back, so that the pack data DPAK generated from the playback data DAU1 and the sub-code data DSB are successively stored at addresses after the general-purpose region NULL. Consequently, the pre-update ring buffer memory 32 in the condition in FIGS. 12(*a*) and 13(*a*) is updated to the condition in FIGS. 12(*b*) and 13(*b*), and the post-update regions FA and FB and main region M are set subsequent to the general-purpose region NULL.

When the update processing is performed in Step S112 in this manner, the beat density detecting unit 39, the beat position detecting unit 40, and the beat density computing unit 47 compute the beat density data DBT based on the playback data DAU1 newly read out from the optical disc 13, and in Step S114, the newly computed beat density data DBT are added to the beat density display area 48 in the display unit 3 and displayed thereon. In other words, in addition to the beat density data DBT already displayed on the beat density display area 48 in the display unit 3, the newly computed beat density data DBT are displayed, whereby an information volume of the displayed beat densities increases. For example, the display of the beat densities for one song of music increases gradually.

Then, in Step S122, the system controller 29 judges whether all the tracks in the optical disc 13 are played back or not based on the Q sub-code and the data DPQ from the playback position detecting unit 52, and when all the tracks have been played back, the system controller 29 terminates the processing. When not, the flow proceeds to Step S124, so that the reading of the pack data DPAK stored in the ring buffer memory 32 is continued to repeat the processing from Step S108.

Next, the following description will describe an operation when it is judged that the jog dial 4 is not manipulated to rotate excessively in Step S110.

When the jog dial 4 is not manipulated to rotate excessively, the flow proceeds to Step S116, and whether the pack data DPAK stored in the ring buffer memory 32 are insufficient or not is judged.

A condition that the pack data DPAK are insufficient means, for example, a condition that an address AD2 in the rear region R shown in FIG. 4(*b*) is set and a remaining volume of the pack data DPAK necessary to produce a playback sound becomes too low. In the present embodiment, the rear region R is divided into two regions RA and RB, and the insufficiency of the pack data DPAK is judged when addresses are set in the region RB positioned at the logical end address ABW side, whereupon the flow proceeds to Step S118. On the other hand, when addresses are still set in a region before the region RB, it is judged that the pack data DPAK are sufficient, and the processing is repeated from Step S108.

In Step S118, the update processing is performed in the same manner as was in Step S112. To be more specific, in the same manner as are shown in FIGS. 10(*a*) and 10(*b*) and FIGS. 11(*a*) and 11(*b*), the pack data DPAK left in the pre-update rear region R are used intact as updated pack data DPAK in the post-update front region F, and the pickup 17 reads out only the data necessary for an update from the optical disc 13. Then, the pack data replacing unit 38 generates the pack data DPAK from the read out playback data DAU1 and sub-code data DSB. Then, by overwriting the pack data DPAK successively from the post-update front region F to be stored therein, the main region M and the rear region R are created.

Hence, when the forward playback continues while the jog dial 4 is at rest or the jog dial 4 is not manipulated to rotate excessively, the stored contents in the ring buffer memory 32 are gradually updated so as not to cause any problem in producing a playback sound.

When the update processing is performed in Step S112 in this manner, the beat density detecting unit 39, the beat position detecting unit 40, and the beat density computing unit 47 compute the beat density data DBT based on the playback data DAU1 newly read out from the optical disc 13, and in Step S120, the newly computed beat density data DBT are added to the beat density display area 48 in the display unit 3 and displayed thereon. In other words, in addition to the beat density data DBT already displayed on the beat density display area 48 in the display unit 3, the newly computed beat density data DBT are displayed, whereby an information volume of the displayed beat densities increases. For example, the display of the beat densities for one song of music increases gradually.

Then, the flow proceeds to Step S122, and when all the tracks have been played back, the processing is terminated. When not, the flow proceeds to Step S124, so that the reading of the pack data DPAK stored in the ring buffer memory 32 is continued to repeat the processing from Step S108.

Although it is not shown in the flowchart in FIG. 9, during a period when the jog dial 4 is at rest and a playback sound is produced while the pack data DPAK stored in the ring buffer memory 32 are read out, the pickup 17 reads out the data from the optical disc 13, and the beat detecting unit 39, the beat position detecting unit 40, and the beat density computing unit 47 analyze the playback data DAU1 and the subcode data DSB contained in the read out data, whereby the beat density data DBT indicating the beat density are generated.

In other words, during a period when the jog dial 4 is at rest and a playback sound is produced while the pack data DPAK stored in the ring buffer memory 32 are read out, no new pack data DPAK are stored in the ring buffer memory 32, and the beat density data DBT are generated to be supplied to the display unit 3.

Hence, the beat density data DBT are generated during a time interval that does not cause any problem in playing a playback sound and supplied to the display unit 3, and as a consequence, not only can the beat density data DBT be generated in Steps S112 and S114, or S118 and S120 in FIG. 9 and added to the display unit 3, but also the beat densities of one song of music as shown in FIG. 8(a) as an example can be displayed sooner.

As has been discussed above, according to the present embodiment, the beat density detecting apparatus composed of the beat detecting unit 39, the beat position detecting unit 40, and the beat density computing unit 47 extract the characteristics of the beat density contained in the audio information, such as music, corresponding to an elapsed time while the audio information is being played back, which makes it possible to find the characteristics of the audio information as a whole.

By displaying the beat density on the display unit 3 corresponding to an elapsed time while the audio information is being played back, the user can easily understand the characteristics of the audio information as a whole, which makes it possible to enhance convenience.

Further, besides the display of the beat density, the elapsed time up to the current point at which a playback sound is actually outputted is displayed. Hence, it is possible to provide a guideline to check the whole of the characteristics of the audio information, which makes it possible to enhance convenience to the user.

In particular, when a player called a disc jockey manipulates the audio editing apparatus 1, he/she can understand entire melodies of music or the like by seeing the display of the beat density corresponding to the elapsed time, so that he/she can search a desired melody portion, which offers an advantage that he/she can present a performance in a way the audience wants.

The present embodiment described a case where the data stored in a CD or a DVD are played back. It should be appreciated, however, that the present invention is not limited to the foregoing, and it is also possible to extract the characteristics of the beat density from the audio information stored in an MD (Mini Disc) as another recording medium. Also, it is possible to extract the characteristics of the beat density from the audio information stored in a static storage medium, such as a semiconductor memory.

Alternatively, it may be arranged in such a manner that the beat density data DBT are stored in a memory card inserted into the memory card slot 10 shown in FIG. 2, and when the recording medium such as a CD, a DVD, and an MD, is played later, the display unit 3 displays the beat density data DBT stored in the memory card. According to this arrangement, it is possible to display the beat density more promptly, thereby offering an advantage, such as enhancing convenience to the user or the like.

Also, the present embodiment described the audio editing apparatus called an effecter. It should be appreciated, however, that the beat density detecting apparatus can be applied extensively to electronic equipment handling audio information, such as a car audio apparatus or a home-use audio apparatus in addition to the audio editing apparatus described herein.

As has been discussed, according to the beat density detecting apparatus of the present invention, the characteristics of a relatively long period of a signal subject to audio playback, or the whole of the characteristics of a signal subject to audio playback are detected as the beat density, which is novel characteristics information, and the beat density is displayed corresponding to an elapse of an entire playback time of a signal subject to audio playback. Hence, it is possible to provide the characteristics of a signal subject to audio playback as a whole.

Also, according to the information playback apparatus, while the information recorded in an information recording medium, for example, music information or the like, is played back, the characteristics of a relatively long period or the whole of the characteristics of the information are detected as the beat density, which is novel characteristics information, and the beat density is displayed corresponding to an elapse of an entire playback time of the information. Hence, it is possible to provide the characteristics of the information recorded in the information recording medium as a whole. Consequently, it is possible to provide the whole of the characteristics of the information recorded in an information recording medium, such as a CD, a DVD, and an MD, in a mode that can be visually recognized with ease, thereby making it possible to enhance convenience to the user or the like.

Also, according to the information playback apparatus of the present invention, the current point at which the information recorded in an information recording medium, such as music information, is being played back is displayed corresponding to the characteristics information of the beat density. Hence, it is possible to provide a guideline or the like to know the correspondence between the current point at which the information is being played back and the characteristics information of the beat density, thereby making it possible to enhance convenience to the user or the like.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A detecting apparatus for detecting characteristic of an audio signal, comprising:
    a beat density detecting unit for detecting, as beat density, number of occurrences of amplitude change in a predetermined frequency band of said audio signal within a predetermined period of said audio signal,
    wherein said beat density corresponding to elapse of playback time at song unit of said audio signal is found as said characteristic of the audio signal, and
    wherein the beat density detecting unit detects the number of occurrences of amplitude change in a plurality of predetermined frequency bands, and has a beat density computing unit for multiplying the number of occurrences of amplitude chance in each frequency band by a predetermined coefficient, and adding together the products of all multiplications to find a beat density.

2. The detecting apparatus according to claim 1, further comprising an adjustment unit for adjusting said predetermined period.

3. The detecting apparatus according to claim 1, further comprising a storage unit for storing said characteristic of the audio signal.

4. The detecting apparatus according to claim 3, wherein said storage unit is a freely attachable/detachable memory.

5. The detecting apparatus according to claim 1, further comprising a display unit for displaying said characteristic of the audio signal corresponding to elapse of playback time of said audio signal.

6. The detecting apparatus according to claim 5, further comprising a position detecting unit for detecting the position of said audio signal being currently played back, wherein said display unit displays a position detected by said position detecting unit.

7. The detecting apparatus according to claim 5, wherein beat density displayed by said display unit increases with elapse of playback time.

8. The detecting apparatus according to claim 5, which detects said beat density to display during a time period not hampering the playback of said audio signal.

9. The detecting apparatus according to claim 1, further comprising:
a playback unit for playing back, as said audio signal, information recorded in information recording medium.

10. The detecting apparatus according to claim 9, which is for use in DJ operations.

* * * * *